US006453239B1

(12) United States Patent
Shirasaka et al.

(10) Patent No.: US 6,453,239 B1
(45) Date of Patent: Sep. 17, 2002

(54) METHOD AND APPARATUS FOR BOREHOLE SURVEYING

(75) Inventors: Ichiro Shirasaka, Sugar Land; Kirby G. Schrader; Jean-Michel Hache, both of Houston, all of TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/327,873

(22) Filed: Jun. 8, 1999

(51) Int. Cl.$^7$ ............................................... E21B 47/22
(52) U.S. Cl. ........................ 701/220; 33/304; 73/152.54; 702/6; 175/45
(58) Field of Search .................... 701/220; 702/6; 73/152.54, 151; 33/304, 324, 313; 175/45, 26

(56) References Cited

U.S. PATENT DOCUMENTS

| | | |
|---|---|---|
| 3,753,296 A | 8/1973 | Van Steenwyk |
| 4,192,077 A | 3/1980 | Van Steenwyk et al. |
| 4,197,654 A | 4/1980 | Van Steenwyk et al. |
| 4,199,869 A | 4/1980 | Van Steenwyk |
| 4,265,028 A | 5/1981 | Van Steenwyk |
| 4,293,046 A | 10/1981 | Van Steenwyk |
| 4,297,790 A | 11/1981 | Van Steenwyk et al. |
| 4,433,491 A | 2/1984 | Ott et al. |
| 4,454,756 A | 6/1984 | Sharp et al. |
| 4,461,088 A | 7/1984 | Van Steenwyk |
| 4,468,863 A | 9/1984 | Van Steenwyk |
| 4,471,533 A | 9/1984 | Van Steenwyk et al. |
| 4,507,958 A | 4/1985 | Russell et al. |
| 4,542,647 A | 9/1985 | Molnar |
| 4,559,713 A | 12/1985 | Ott et al. |
| 4,594,790 A | 6/1986 | Engebretson |
| 4,611,405 A | 9/1986 | Van Steenwyk |
| 4,706,388 A | 11/1987 | Van Steenwyk |
| 4,768,152 A | 8/1988 | Egli et al. |
| 4,812,977 A * | 3/1989 | Hulsing, ll ................ 702/6 |
| 4,909,336 A | 3/1990 | Brown et al. |
| 4,987,684 A | 1/1991 | Andreas et al. |
| 5,657,547 A | 8/1997 | Uttecht et al. |
| 5,821,414 A | 10/1998 | Noy et al. |

OTHER PUBLICATIONS

Matthews, Anthony, et al., "Dual Use HRG for Space and Subterranean Applications", 34$^{th}$ Space Congress, Apr. 24, 1997, Litton Guidance and Control Systems.

*Primary Examiner*—William A. Cuchlinksi, Jr.
*Assistant Examiner*—Arthur D. Donnelly

(57) ABSTRACT

The invention is, in its various aspects, a method and apparatus useful for strapdown inertial navigation and surveying in a borehole. The method comprises maneuvering a probe including three vibrating mass, Coriolis effect gyroscopes in a borehole and initializing the probe's attitude in the borehole within the probe's frame of reference. Three orthogonal, incremental rotation angles and three orthogonal, incremental velocities are determined for the probe within the probe's frame of reference. The incremental rotation angles are determined from the gyroscopes. The method then translates the three incremental velocities from the probe's frame of reference into the inertial frame of reference using the three incremental rotation angles. Next, a velocity vector in a local-vertical, wander-azimuth frame of reference is determined from the translated incremental velocities. A velocity error observation is then obtained. A system error is then estimated from the velocity vector and the velocity error observation. The system error is then fed back into the inertial navigation system for use in refining the method. In as second aspect, the invention is a strapdown, inertial measurement unit. The inertial measurement unit includes a housing, three accelerometers, and three vibrating mass, Coriolis effect gyroscopes. The three accelerometers are mounted within the housing. The three vibrating mass, Coriolis effect are rigidly mounted within the housing.

71 Claims, 12 Drawing Sheets

OTHER PUBLICATIONS

Stephenson, Mark A., et al., "Improving Quality Control of Directionaal Survey Data with Continuous Inertial Navigation", *SPE Drilling Engineering* (Jun. 1992), pp. 100–106. jf124c Matthews, A. et al., "Comparison of Hemispherical Resonator Gyro and Optical Gyros", *IEEE AES Magazine* (May 1992), pp. 40–46.

Shangchun, F. et al., "Theory and Experiments on Operating Principle of Hemispherical Resonator Gyro", ICAS Paper No. ICAS–92–1.4.1 (1992), pp. 632–636.

Dickinson, Jack et al., "HRG Strapdown Navigator", IEEE Document No. CH2811–8/90/0000/0110 (Aug. 1990), pp. 110–117.

Mason, Lawrence E., "Fault Tolerant Solid–State Attitude Reference", AAS Paper 88–107 (1988), pp. 189–202.

Loper, E.J. et al., "Projected Performance of Smaller Hemispherical Resonator Gyros", IEEE Document No. CH2365 5/86/0000–0061 (May 1986), pp. 61–64.

Stephenson, Mark, "Program Challenges Directional Survey Accuracy Claims", *Oil and Gas Journal* (Aug. 20, 1984), pp. 112–124.

Loper, E.J. et al., "Projected System Performance Based on Recent HRG Test Results", IEEE Document No. CH1839–0/83/0000–0081 (1983), pp. 18.1.1–18.1.6.

Brezezowski, S. et al., "Analysis of Alternate Borehole Survey Systems", *Navigation: Journal of the Institute of Navigation* (vol. 20, No. 4, 1983–1984), pp. 309–324.

Kohler, Stewart M., "Inertial Navigation System for Directional Surveying", *Sandia Report No. SAND–82–1668*(Sep. 1982).

Morgan. D.G. et al., "High Accuracy Directional Surveying of Wells Employing Inertial Techniques", 11th Annual Offshore Technology Conference in Houston, Texas, Apr. 30–May 3, 1979, pp. 33–40.

* cited by examiner

METHOD AND APPARATUS FOR BOREHOLE SURVEYING

BACKGROUND OF THE INVENTION

1. Field of the Invention

The invention relates to a method and apparatus for precisely, in both multishot (discrete) and continuous borehole surveys, mapping boreholes during Measurement-While-Drilling ("MWD") and WireLine ("WL") logging operations. More particularly, the invention relates to a strapdown gyrocompassing and inertial navigation system vibrating mass,. Coriolis effect gyroscopes for determining the precise path of deep, small diameter boreholes.

2. Description of the Related Art

Borehole survey systems used for geological surveying and drilling of oil and gas wells generally map or plot the path of a borehole by determining borehole azimuth and borehole inclination at various points along the borehole. "Azimuth" may be considered, for present purposes, to be the directional heading relative to a reference coordinate, such as north. "Borehole inclination" may be considered, also for present purposes, the deviation from the vertical.

For example; in one type of known system, a tool or probe contains several magnetometers for indicating azimuth and several accelerometers for indicating inclination. The probe is suspended by a cable, and then raised and lowered through the borehole. In such a system the directional coordinates of the probe are determined at several points along the borehole. When sufficient measurements at discrete points along the borehole are made, they are plotted to map the borehole. The map can be determined relative to a desired coordinate system. This type of system has become known as a WireLine ("WL") survey system.

A second type of known system is utilized during what has become known as Measurement-While-Drilling ("MWD") operations. MWD equipment traditionally includes magnetometers and accelerometers disposed on each of three orthogonal axes of a tool, or probe, in a drill string assembly. Such a probe has typically been part of a special drill collar placed a relatively short distance above a drilling bit. The drilling bit bores the earth formation as the drill string is turned in the wellbore by a rotary table of a drilling rig at the surface. The drill string's rotation is periodically stopped so that the probe may generate magnetometer data regarding the earth's magnetic field and accelerometer data regarding the earth's gravitational field. The data is generated with respect to the orthogonal axes of the probe. The magnetometer data and the accelerometer data are then used to determine the heading of the well.

These techniques suffer from the fact that the earth's magnetic field varies with time. Also, the measurable magnetic field is affected by structures containing iron or magnetic ores near the probe. Even the casing supporting the wellbore can vary the measurable magnetic field. Such variation leads to errors and uncertainty in the determination of the well heading by undesirably influencing the data.

Various considerations have brought about an ever increasing need for more precise and compact borehole surveying techniques. For example, modern gas and oil drilling techniques have brought about smaller diameter boreholes and often require that wells be closely spaced. Additionally, it is not unusual for a number of wells to be drilled toward different geological targets from a single wellhead or drilling platform. Further, depletion of relatively large deposits has made it necessary to drill deeper and to access smaller target formations. Even further, in the event of a deep, high-pressure blowout, precise knowledge of the borehole path is required so that a relief well can be properly drilled to intercept the blowout well.

One proposal for providing a small diameter probe for a borehole survey system and for yielding more accurate. measurements applies inertial navigation techniques. Generally speaking, inertial navigation techniques utilize a set of accelerometers and a set of gyroscopes. The accelerometers supply signals representing acceleration of the instrumentation package along the three axes of a Cartesian coordinate system. The gyroscopes supply signals representative of the angular rate at which the instrumentation package is rotating relative to that same Cartesian coordinate system. Magnetic field variations can theoretically be eliminated by adding gyroscopes to each of the orthogonal axes of the probe. The heading of the probe can then be determined from accelerometer data from each of such axes and gyroscopic data from each of such axes. The accelerometer data is responsive to the gravitational field of the earth, while the gyroscopic data is responsive to the rotational velocity of the earth with respect to inertial space.

The first basic type of Inertial Navigation System ("INS") is the "gimballed" system. In gimballed systems, the gyroscopes and accelerometers are mounted on a fully gimballed platform maintained in a predetermined rotational orientation by gyro-controlled servo systems. This arrangement effectively maintains the accelerometers in fixed relationship so that the accelerometers provide signals relative to a coordinate system substantially fixed in inertial space. Successive integration of the acceleration signals with respect to time yields signals representing the velocity and position of the instrumentation package in inertial space. However, known gimballed systems have generally been unsatisfactory because of the size of the gimbals required for the gyroscopes. Such systems do not readily withstand the shock, vibration and temperature inherently encountered in the survey of deep boreholes. In addition, gyroscope drift, precession, sensitivity to g-forces and other factors seriously affect system accuracy.

The second basic type of inertial navigation system is the "strapdown" inertial navigation system. In strapdown systems, the gyroscopes and accelerometers are fixed to and rotate with the instrumentation package and, hence, with the borehole survey probe. In such a system, the accelerometers provide signals representative of the instrument package acceleration along a Cartesian coordinate system that is fixed relative to the instrumentation package. The gyroscope output signals are processed to translate the measured accelerations into a coordinate system that is fixed relative to the earth. Once translated into the earth-referenced coordinate system, the acceleration signals are integrated in the same manner as in a gimballed navigation system to provide velocity and position information. In many known strapdown systems (or hybrid strapdown configurations in which the accelerometers are gimballed relative to the longitudinal axis of the probe), the probe must be frequently stopped to correct for velocity errors that are caused by instrument drift.

One strapdown INS for surveying boreholes is disclosed in U.S. Pat. No. 4,812,977, issued Mar. 14, 1989, to Sundstrand Data Control, Inc. as the assignee of the inventor Rand H. Hulsing, II ("the '977 patent"). The '977 patent discloses a strapdown INS for use in WL operations. This particular INS employs ring laser gyroscopes, which have proven to be unreliable for MWD operations because of their susceptibility to shock, temperature, and other drilling conditions.

A hybrid strapdown/gimballed INS for surveying boreholes is disclosed in U.S. Pat. No. 4,987,684, issued Jan. 20, 1991, to The United States of America, as the assignee of the inventors Ronald D. Andreas, et al. This INS employs two dual axis gyroscopes and three single axis accelerometers strapped to a sensor block that is gimballed. Thus, although partially strapped down, the gimbal will nevertheless necessitate undesirably large dimensions for the tool. Also, this particular INS, like that in the '977 patent, is limited to WL operations.

The present invention is directed to resolving one or all of the problems mentioned above.

SUMMARY OF THE INVENTION

The invention is, in its various aspects, a method and apparatus useful for strapdown inertial navigation and surveying in a borehole.

In a first aspect of the invention, a method comprises maneuvering a probe including at least three vibrating mass, Coriolis effect gyroscopes in a borehole and initializing the probe's attitude in the borehole within the probe's frame of reference. The incremental rotation angles are determined from the gyroscopes. Three orthogonal, incremental rotation angles and three orthogonal, incremental velocities are determined for the probe within the probe's frame of reference. The method then translates the three incremental velocities from the probe's frame of reference into the inertial frame of reference using the three incremental rotation angles. Next, a velocity vector in a local-vertical, wander-azimuth frame of reference is determined from the translated incremental velocities. A velocity error observation is then obtained. A system error is then estimated from the velocity vector and the velocity error observation. The system error is then fed back into the inertial navigation system for use in refining the method's analysis.

In a second aspect, the invention is a strapdown, inertial measurement unit. The inertial measurement unit includes a housing, three accelerometers, and three vibrating mass, Coriolis effect gyroscopes. The three accelerometers are mounted within the housing. The three vibrating mass, Coriolis effect gyroscopes are rigidly mounted within the housing.

BRIEF DESCRIPTION OF THE DRAWINGS

The invention may be understood by reference to the following description taken in conjunction with the accompanying drawings, in which like reference numerals identify like elements, and in which:

FIGS. 8A–8C illustrate some principles of operation for the HRG of FIGS. 7A–7B;

Figure 1:
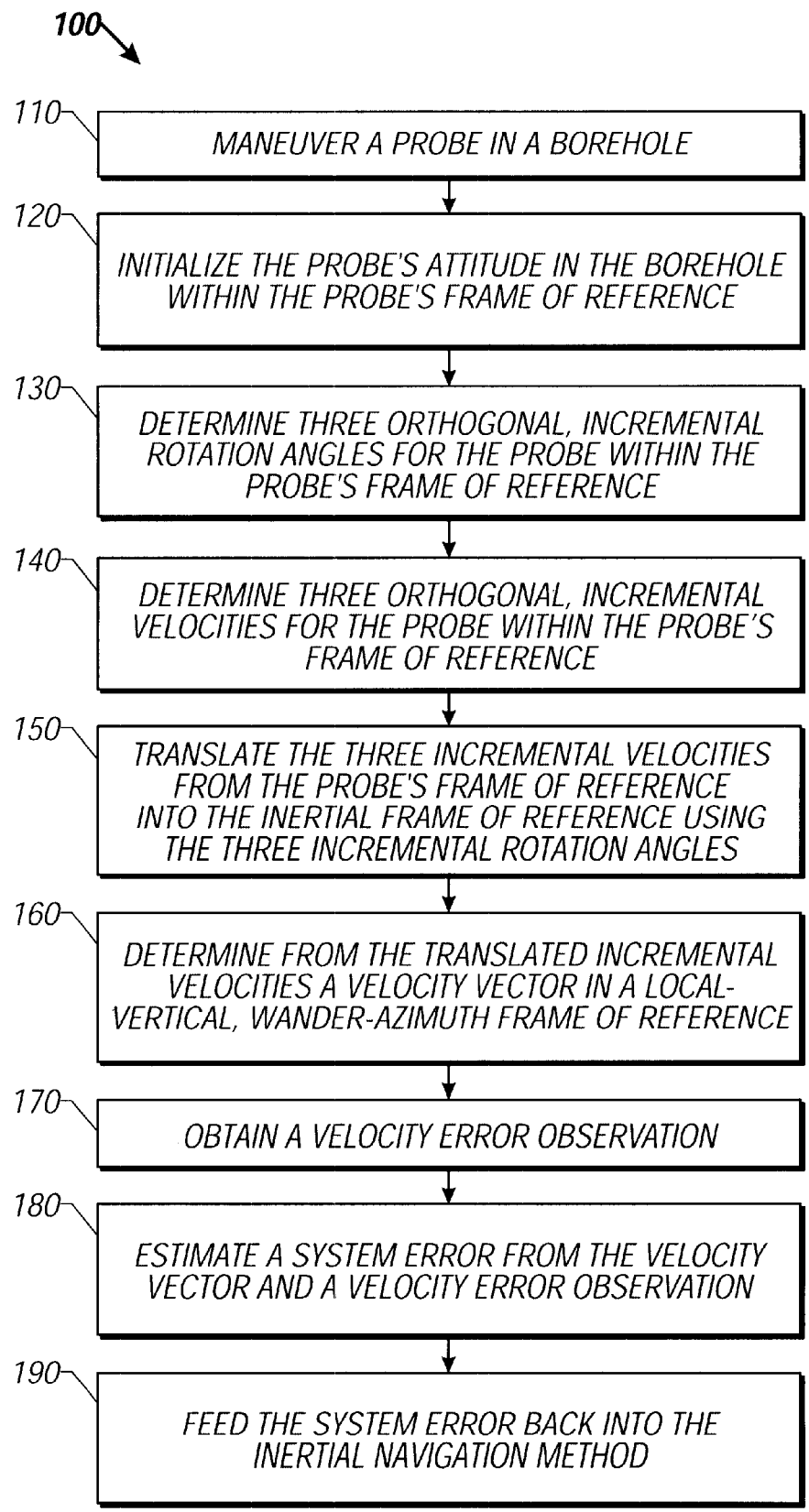
FIG. 1 Illustrates one embodiment of an inertial navigation method in accordance with one aspect of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

In accordance with the present invention, a strapdown gyrocompassing alignment and strapdown inertial navigation system are implemented in a manner making high precision mapping of a borehole possible. The system utilizes a probe rigidly mounting three vibrating mass, Coriolis effect gyroscopes and three accelerometers in a strapdown mechanization. The system may be used in survey operations that can be classified as:

(i) multishot gyrocompassing along the borehole in Measurement-While-Drilling ("MWD");

(ii) multi-shot gyrocompassing along the borehole in WireLine ("WL") logging;

(iii) Zero-velocity-UPdaTe ("ZUPT") correction to inertial navigation in MWD;

(iv) ZUPT correction to inertial navigation in WL logging;

(v) a continuous cable-aided inertial navigation in WL logging.

In the operations (iii) and (v), displacements of the probe are obtained by a strapdown inertial navigation technique of computing the attitude from the gyroscope triad outputs and using the attitude information to translate measured velocity increments from the accelerometer triad into velocity increments in specific directions, e.g., north, east, down, etc.

A Method in Accordance with the Present Invention

FIG. 1 illustrates one embodiment of a strapdown inertial navigation method in accordance with one aspect of the invention. The method 100 begins by maneuvering a probe in a borehole, as set forth in the box 110. The probe includes at least three vibrating mass, Coriolis effect gyroscopes. More than three such gyroscopes may be used in embodiments where redundancy is desirable. The particular manner in which the probe will be maneuvered will be implementation specific. The manner will determined largely by the type of operations being conducted, MWD or WL operations. However, other factors may come into play also, e.g., whether the survey uses ZUPT correction.

The method 100 continues, as set forth in the box 120, by initializing the probe's attitude in the borehole within the probe's frame of reference. In one embodiment, this initialization will include at least one of a coarse, or analytic, alignment and a fine alignment, and will typically include both. The coarse alignment and the fine alignment will typically include filtering and error compensation. The error compensation comprises accelerometer error compensation and gyroscopic error compensation for major deterministic errors. Exemplary major deterministic errors include, but are not limited to, bias, scale factor error, and misalignment. The initialization is typically performed from three orthogonal, incremental rotation angles and three orthogonal, incremental velocities for the probe obtained as discussed below in connection with boxes 130, 140.

Next, the method 100 determines three orthogonal, incremental rotation angles, as set forth in the box 130, and three orthogonal, incremental velocities, as set forth in the box 140, for the probe. The incremental rotation angles are determined from the gyroscopes. Both the incremental rotation angles and the incremental velocities are determined within the probe's frame of reference.

The method 100 then continues by translating the three incremental velocities from the probe's frame of reference into the inertial frame of reference using the three incremental rotation angles, as set forth in the box 150. The translation may be aided by a linear estimator or a non-linear estimator. Both the linear and the non-linear estimator may include a linear Kalman filter, an extended Kalman filter, a backward Kalman smoother, or a minimum model error estimator.

As set forth in the box 160 the method 100 next determines from the translated incremental velocities a velocity vector in a local-vertical, wander-azimuth frame of reference. This translation will typically include the application of an earth gravity model.

Next, as set forth in the box 170, the method 100 obtains a velocity error observation. The nature of the velocity error observation and the manner in which it is obtained will be implementation specific. For instance, the velocity error update may be a zero-velocity update such as is known in the art. Alternatively, in a WL operation, obtaining the velocity error observation may include determining a cable velocity and translating that cable velocity into the local-vertical frame of reference.

The method 100 continues by estimating a system error from the velocity vector and a velocity error observation, as set forth in the box 180. The system error estimation may be performed by the velocity vector and the velocity error observation and filtering the sum, such as by applying a Kalman filter to the sum. However, other filtering techniques may be employed.

Then, as set forth in the box 190, the method 100 concludes, in this particular embodiment, by feeding the system error back into the inertial navigation method. In alternative embodiments, the method 100 might include additional functionalities. One such additional functionality is to determine the position, attitude, and/or true vertical depth of the probe at any given time during the survey.

The method 100 admits wide variation in many alternative embodiments. For instance, in some embodiments, the method 100 might further comprise determining the position of the probe from the translated incremental velocities. In other alternative embodiments, the method 100 might further comprise buffering the incremental rotation angles and the incremental velocities before translating the three incremental velocities from the probe's frame of reference into the inertial frame of reference. In still other embodiments, feeding the system error back into the inertial navigation method might include feeding the system error back into one or more of:

- the initialization of the probe's attitude, set forth in the box 120;
- the translation of the three incremental velocities from the probe's frame of reference into the inertial frame of reference, set forth in the box 150; and
- the determination of the updated velocity vector, set forth in the box 160.

These alternatives are addressed further below in discussing particular, exemplary implementations of the method 100.

Figure 2:
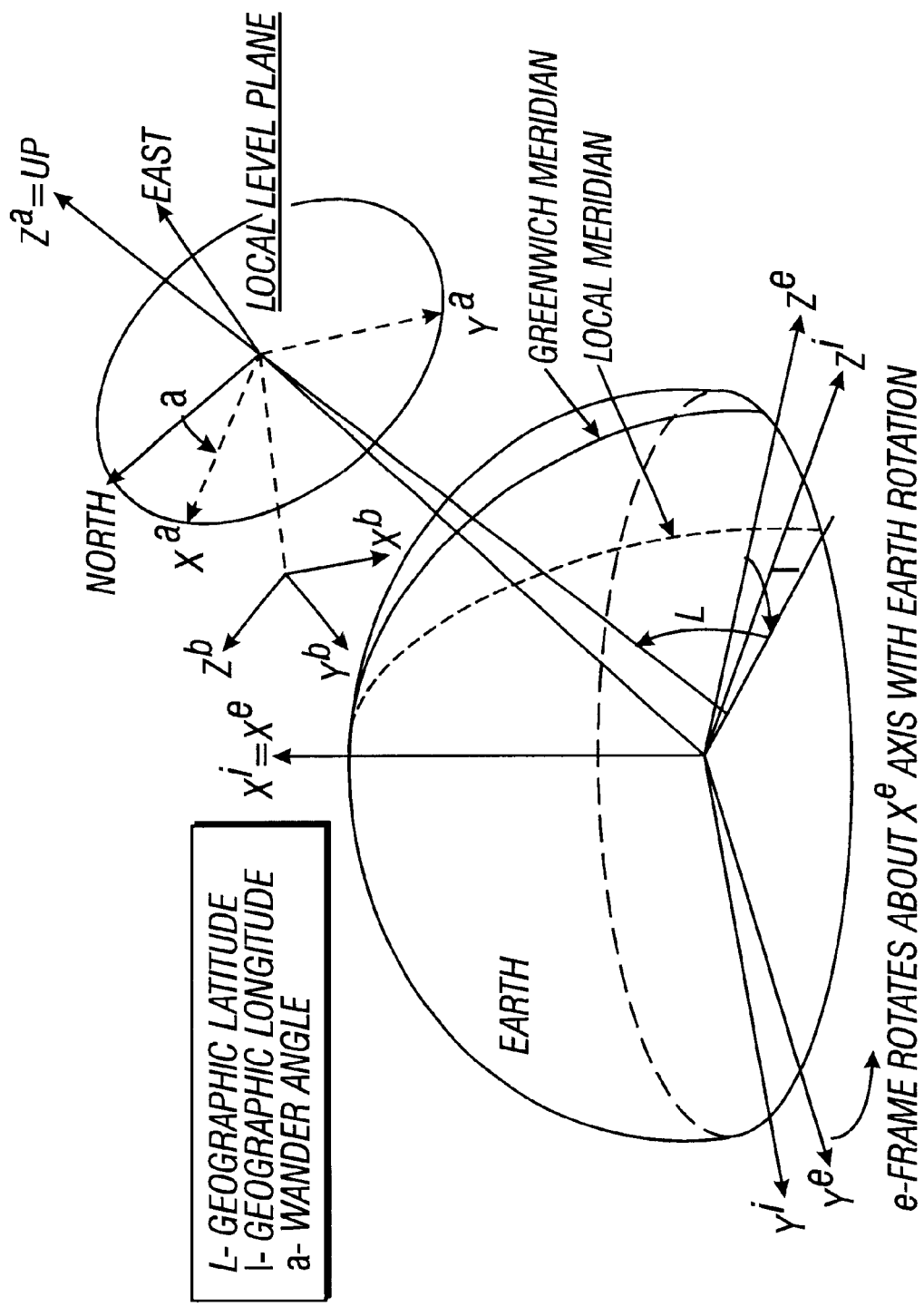
FIG. 2 schematically illustrates inertial navigation coordinate systems that can advantageously employ the present invention.

An Illustration of Inertial Coordinate Systems Used in Disclosing the Present Invention FIG. 2 illustrates a variety of coordinate systems used in disclosing the present invention. As is apparent from the above discussion of the method 100, illustrated in FIG. 1, the present invention employs information in a variety of coordinate systems. For instance, information is gathered in one coordinate system, i.e., the probe's frame of reference, and utilized in a second, i.e., an inertial frame of reference. More particularly, FIG. 2 schematically illustrates typical orthogonal coordinate systems related to the strapdown inertial navigation system disclosed herein, including:

Inertial coordinate system: $(X^i, Y^i, Z^i)$

Earth-fixed coordinate system: $(X^e, Y^e, Z^e)$

Local-vertical coordinate system: (East, North, Up)

Local-vertical wander-azimuth (LVWA) coordinate system: $(X^a, Y^a, Z^a)$

Body coordinate system: $(X^b, Y^b, Z^b)$

The inertial coordinate system is defined as a right-handed non-rotating coordinate system at a fixed star wherein the X-axis is parallel to the Earth's north polar axis. The Earth-fixed coordinate system is defined as a right-handed.coordinate system on Earth wherein the X-axis is aligned to the Earth's polar axis but rotating about the X-axis along with Earth by the Earth rotation rate. The Local-Vertical ("LV") coordinate system can be defined, for instance, such that the X-axis is aligned to East, the Y-axis to North, and the Z-axis to up. The Local-Vertical Wander-Azimuth ("LVWA") coordinate system is identified as the local-vertical coordinate system when wander-angle a: is equal to zero. Otherwise, the LVWA coordinate system is obtained by rotating the LV coordinate system by the angle α about Up axis. Finally, the body coordinate system can be defined such that the X-axis is forward, the Y-axis is left-hand, and the Z-axis is upward, for instance.

Exemplary Embodiments of an Apparatus in Accordance with the Present Invention The survey probe utilized to implement the present invention includes an electronics subassembly and an IMU. The IMU comprises three single-axis, vibrating mass, Coriolis effect gyroscopes and three single-axis accelerometers. These inertial sensors, i.e., the gyroscopes and the accelerometers, are mounted on a sensor block rigidly affixed to the probe housing. Utilizing the three single-axis gyroscopes and the three single-axis accelerometers as a strapdown inertial measurement unit (IMU) provides three axes of angular and linear displacement signals in a certain time.

The six linear and angular displacement signals produced by the inertial sensors are analyzed using the following computation algorithms implemented on the downhole probe or on an uphole computer:

(i) gyrocompassing computations for initializing the probe's attitude by means of analytical (coarse) alignment computation and fine alignment computation possibly employing a Kalman filter;

(ii) velocity-attitude computations using the three-axes gyroscopic signals that update a quaternion or a direction cosine matrix (DCM) from the probe's body frame with respect to the inertial frame and translates the incremental velocity from the three-axes accelerometers into the inertial frame; and (iii) positional computations that compute latitude and longitude using the local-vertical wander-azimuth inertial navigation technique.

The computations of (ii) and (iii) and of True Vertical Depth ("TVD") are aided by a linear or nonlinear estimator to compensate for system errors in combination with zero-velocity or cable-length (speed) signals. The linear and nonlinear estimators may include linear and extended Kalman filters ("KFs"), backward Kalman smoothers, and Minimum Model Error ("MME") estimators.

Note that some portions of the detailed descriptions herein are presented in terms of algorithms, computations, and/or other symbolic representations of operations on data bits within a computer memory. These descriptions and representations are the means used by those skilled in the art to most effectively convey the substance of their work to others skilled in the art. An algorithm or computation is here, and is generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It should be borne in mind, however, that these and similar descriptions are to be associated with the manipulation of the appropriate physical quantities and are merely convenient labels. Unless specifically stated otherwise, or apparent from the following discussions, discussions herein utilizing terms such as "processing," "computing," "calculating," "determining," or the like, refer to the action and processes of a computer system, or similar electronic computing device, that manipulates and transforms data into other data. The data, both original and transformed, are represented as physical quantities within the computer system memories or registers or other such information storage, transmission or display devices.

A First Exemplary Embodiment

Figure 3A:
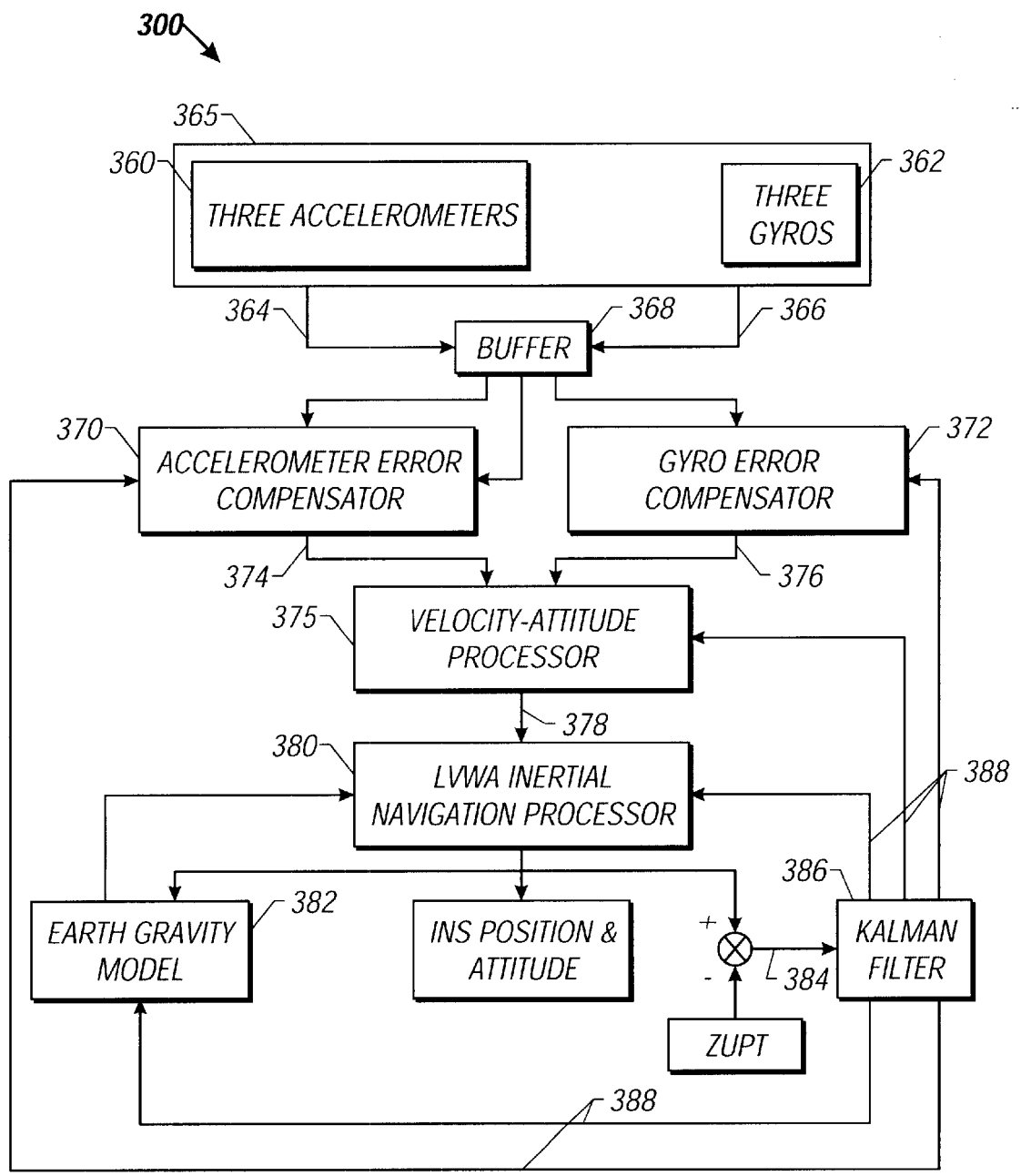
FIGS. 3A–3B illustrate one particular inertial navigation system as may be used to implement one variation of the method in FIG. 1.
Figure 3B:
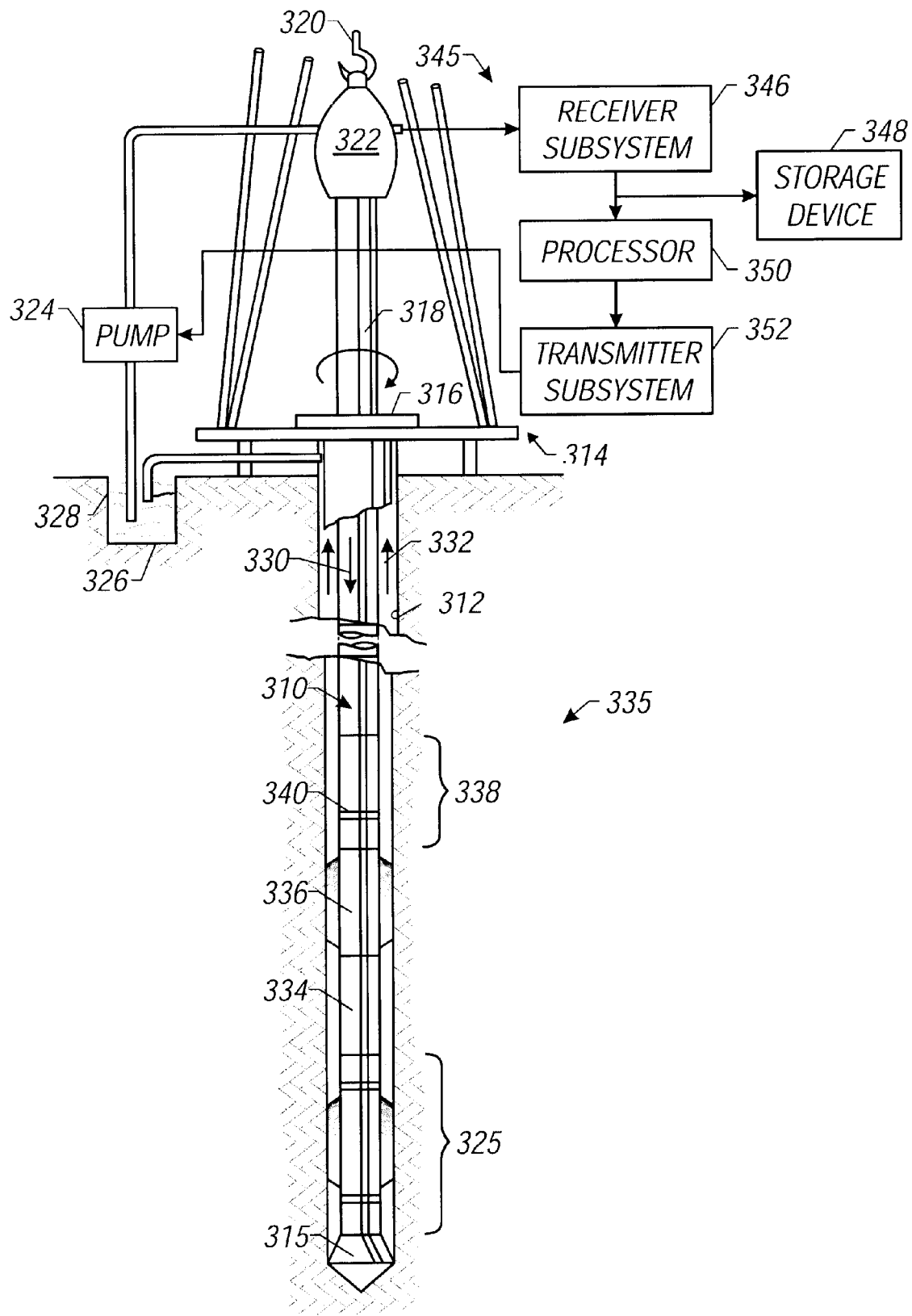

FIGS. 3A–3B illustrate one particular inertial navigation system as may be used to implement one variation of the method in FIG. 1. FIG. 3A is a block diagram that illustrates one arrangement of the invention performing ZUPT correction in inertial navigation signal processing for one type of MWD operation. FIG. 3B depicts the MWD operation in which the apparatus in FIG. 3A is employed to survey the borehole 312. More particularly, FIG. 3A diagrammatically depicts the basic mechanization and arrangement of this embodiment 300. This embodiment 300 provides signals representative of the position of the MWD probe, or bottom hole assembly, 335 in the LVWA coordinate system of FIG. 2 while the probe 335 is continuously moved along the borehole 312 in FIG. 3B.

FIG. 3B illustrates a drill string 310 deployed during an MWD operation in which measurements in an earth borehole 312 are taken with the drill bit 315 and at least some of the drill string 310 in the borehole 312, during drilling, pausing, and/or tripping. A platform and derrick 314 are positioned over a borehole 312 formed in the earth by rotary drilling. The drill string 310 is suspended within the borehole 312 and includes the drill bit 315 at its lower end.

The drill string 310 and the drill bit 315 attached thereto are rotated by a rotary table 316 that engages a kelly 318 at the upper end of the drill string 310. The drill string 310 is suspended from a hook 320 attached to a travelling block (not shown). The kelly 318 is connected to the hook 320 through a rotary swivel 322 that permits rotation of the drill string 310 relative to the hook 320. A pump 324 circulates lubricating drilling fluid 326 from a pit 328, into the drill string 310 through the swivel 322, downward (arrow 330) through the drill string 310, out the drill bit 315, back up (arrows 332) through an annulus (not shown) in the drill string 310, and back to the pit 328 for recirculation.

Mounted within the drill string 310, preferably near the drill bit 315, is a bottom hole assembly 335. The bottom hole assembly 335 can measure, process, and store information, and communicate with the earth's surface. As used herein, "near the drill bit" means within several drill collar lengths from the drill bit 315. The assembly 335 includes an Inertial Navigation System ("INS") probe 325, which includes an Inertial measurement Unit ("IMU") 365 (shown in FIG. 3A) and an electronics subassembly (not shown) as described further below.

In the embodiment illustrated, a drill collar 334 and an optional stabilizer collar 336 are shown successively above the INS probe 325. The collar 334 may be, for example, a pony collar or a collar housing some measuring apparatus which performs measurements other than those described herein. Located above stabilizer collar 336 is a communications subassembly 338. The communications subassembly 338 includes a toroidal antenna 340 used for a variety of communications. The communications subassembly 338 also includes a known type of acoustic communication system (not shown) that communicates with a similar system (also not shown) at the earth's surface via signals carried in the drilling fluid 326 in a conventional manner.

The implementation of FIG. 3B also includes a variety of surface instrumentation 345. The surface instrumentation 345 comprises a receiver subsystem 346, a storage device 348, a processor 350, and a transmitter subsystem 352. The receiver subsystem receives data and other information transmitted uphole from the drill string 310 and forwards it to the storage device 348 and the processor 350. The storage device 348 stores the data, which may then, in some variations, be post-processed using the process 100 of FIG. 1. In the particular embodiment illustrated, the processor 350 processes the data in real-time. The processor 350 also generates a variety of control signals that control the operation of the pump 324 and are transmitted to the pump 324 via the transmitter subsystem 352. In some variations, the transmitter subsystem 352 may also transmit control signals generated by the processor 350 to control the operation of various tools on the drill string 310.

Returning to FIG. 3A, three accelerometers 360 and three gyroscopes 362, none of which are individually shown, of the strapdown IMU 365 each produce a temperature compensated signal. The accelerometers 360 and the gyroscopes 362 are preserably oriented orthogonally relative to each other. However, this is not necessary to the practice of the invention so long as their relative positions are known. The three accelerometers 360 effect a three-axis accelerometer as is known in the art and represent three incremental velocities of the probe 335 measured in the body coordinate frame. The three gyroscopes 362, in this particular embodiment, are a type of vibrating mass, Coriolis effect gyroscope known as a Hemispherical Resonator Gyroscope ("HRG") as are discussed further below. Their signals represent three incremental rotation angles, also measured in the body coordinate frame. The three temperature-compensated three-axis accelerometer signals 364 and the three-axis gyroscopic signals 366 from the strapdown IMU 365 are then fed into a buffer 368.

The signals 364, 366 are compensated for major deterministic error coefficients in the inertial sensors, i.e., the accelerometers 360 and the gyroscopes 362, in the accelerometer error compensator 370 and the gyroscope error compensator 372, respectively. Exemplary "major deterministic error coefficients" include, but are not limited to, bias, scale factor error, and misalignment. The compensated signals 374, 376 are transmitted to the velocity-attitude processor 375.

The velocity-attitude processor 375 either updates a body-to-inertial Direction Cosine Matrix ("DCM") or a body-to-inertial quaternion. One particular implementation employs the body-to-inertial DCM, and this implementation will be used to further discuss this particular embodiment. The calculated body-to-inertial DCM translates the incremental velocity vector from the body coordinate system to the inertial coordinate system. The updated body-to-inertial DCM and the inertial incremental velocity vector are provided, 378, to the LVWA inertial navigation processor 380. The LVWA inertial navigation processor 380, in this particular embodiment, employs an Earth gravity model 382. The Earth gravity model 382 in this particular implementation is the World Geodetic Survey (WGS-72/84) model in general.

The velocity vector in the LV coordinate system (east-north-up) determined by the LVWA inertial navigation processor 380 gives a velocity error observation when the probe 335 is at rest since the reference velocity at rest is zero-velocity. The velocity error observation is provided, 384, into the Kalman filter 386. The Kalman filter 386 estimates the system error states and compensates for system errors by feedback 388 into the Inertial Navigation System ("INS") 300. In this particular embodiment, the system error is fed back, 338, into the acceleration error compensator 370, gyroscope error compensator 372, the velocity attitude processor 375, the LVWA inertial navigation processor 380, the earth gravity model 382. Note that in some implementations, some of the feedbacks 388 may be omitted.

Referring now to both FIGS. 3A and 3B, the gyroscopic and accelerometer data is transmitted, 364, 366, by the IMU 365 uphole for processing by the surface instrumentation 345. Thus, the only portion of the INS system 300 that is located downhole on the INS probe 325 is the IMU 365. The remaining functionality portrayed in FIG. 3A is, in this particular embodiment, located uphole and performed by various portions of the surface instrumentation 345. As is discussed further below, this remaining functionality is typically oriented in software, such that it is implemented by the processor 352 executing instructions on the storage device 348.

A Second Exemplary Embodiment

Figure 4A:
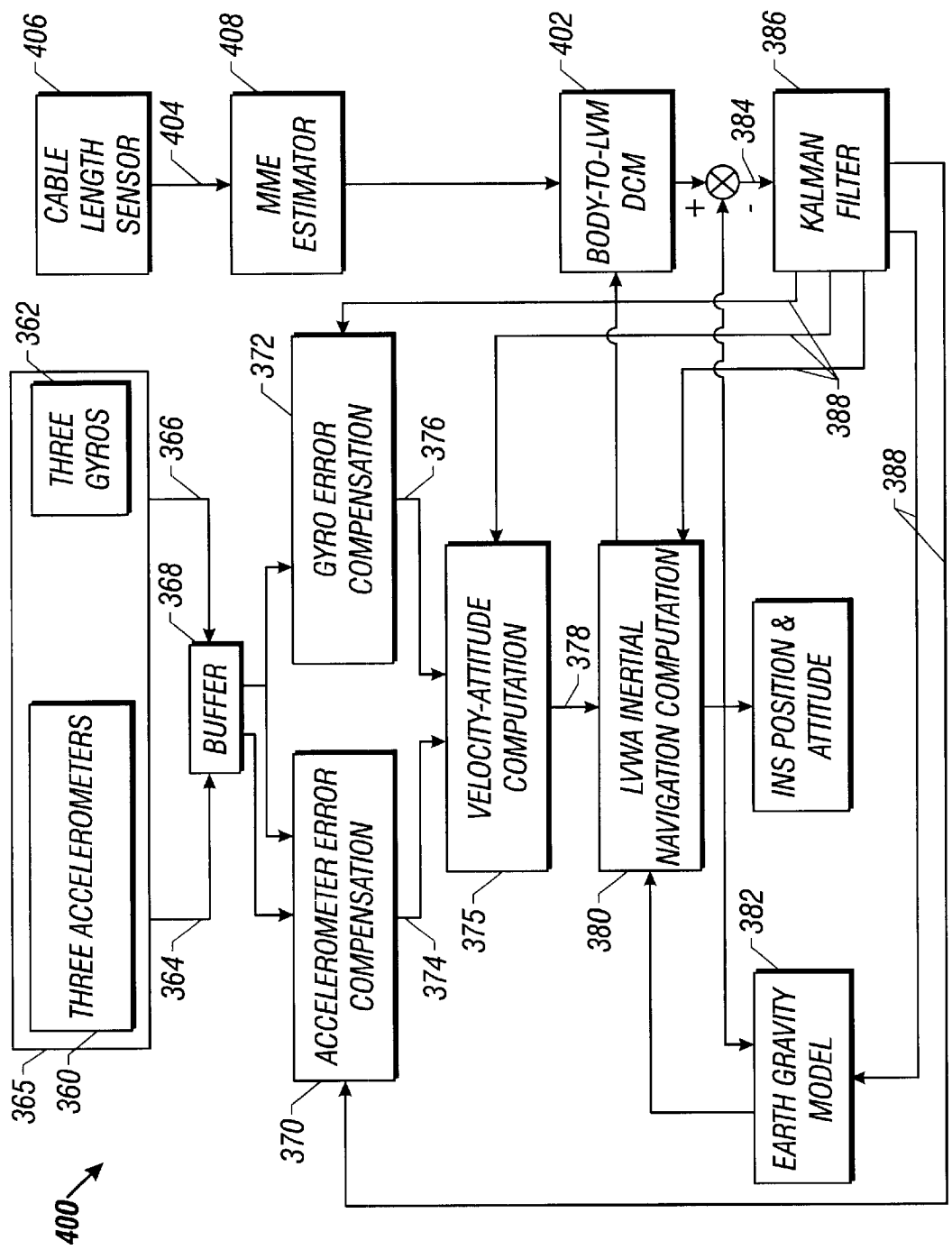
FIGS. 4A–4B illustrate a second particular inertial navigation system as may be used to implement one variation of the method in FIG. 1 alternative to that in FIG. 3.
Figure 4B:
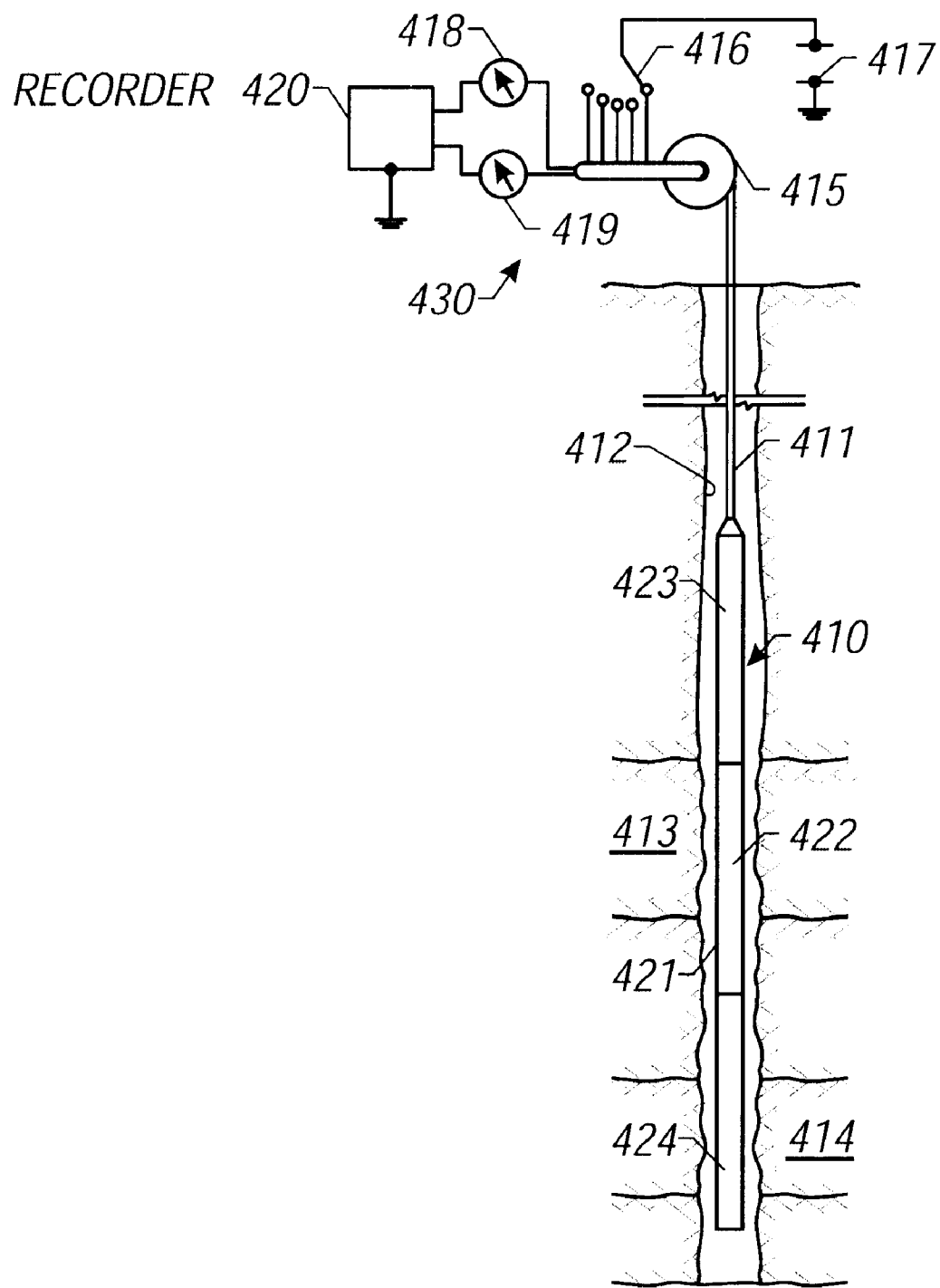

FIG. 4A is a functional block diagram of a second particular inertial navigation system 400 as may be used to implement one variation of the method in FIG. 4B alternative to that in FIG. 3. More particularly, FIG. 4A is a block diagram illustrating one arrangement of the invention for performing a cable-velocity-aided inertial navigation signal processing for one type of WL operation. The inertial navigation system 400 shares many common components with the inertial navigation system 300 in FIG. 3, and like parts bear like numbers. Despite these similarities, however, the systems 300 and 400 diverge in at least one significant respect. The system 300 is used in implementations of the method 100, illustrated in FIG. 1, employing zero-velocity updates whereas the system 400 is used in continuous cable-aided implementations of the method 100.

Turning now to FIG. 1, a tool, or probe, 410 is suspended from a multi-conductor cable 411 in a well bore, such as an uncased borehole 412, penetrating one or more potentially producible earth formations 413, 414. As is customary, the cable 411 is spooled from a winch 415 at the surface and is terminated at typical surface equipment 430, including a selectively controlled switch 416, a power source 417, and one or more indicating and recording devices 418–420. The probe 410 comprises an elongated body 421 housing an electronics subassembly 422, a communications subassembly 423, and an IMU 424. The IMU 424 includes three accelerometers 360 and three vibrating mass, Coriolis effect gyroscopes 362, both shown in FIG. 4A. The electronics subassembly 422 provides power and communications capabilities for the IMU 424. In some embodiments, the electronics subassembly 422 includes magnetometers (not shown) as well. The communications subassembly 423 provides communications between the surface equipment 430 and the electronics subassembly 422.

Returning to FIG. 4A, the system 400 differs from the system 300 in FIG. 3A in the manner in which the velocity error observation is obtained. This is a function of the nature of WL operations vis-à-vis MWD operations. The velocity error observation is obtained by subtracting a cable velocity (which was translated from the body to LV by the DCM 402) from the calculated probe velocity in the LV coordinate system (east-north-up) by the LVWA inertial navigation processor 380 gives a velocity error observation when the probe 335 is in motion. The reference cable velocity in the LV coordinate is estimated from a cable length indication 404 from the cable length sensor 406 by the MME estimator 408. Note that some variations on this embodiment might employ a non-linear estimator alternative to the MME estimator 408. The MME estimator 408 essentially eliminates the need of a priori nonlinear error model of the WL cable dynamic system. The well referenced velocity error observation with minimal systematic error is thus provided into the Kalman filter 386. The Kalman filter 386 estimates the system error states and compensates for system errors by feedbacks 388 into the system 400.

Figure 5:
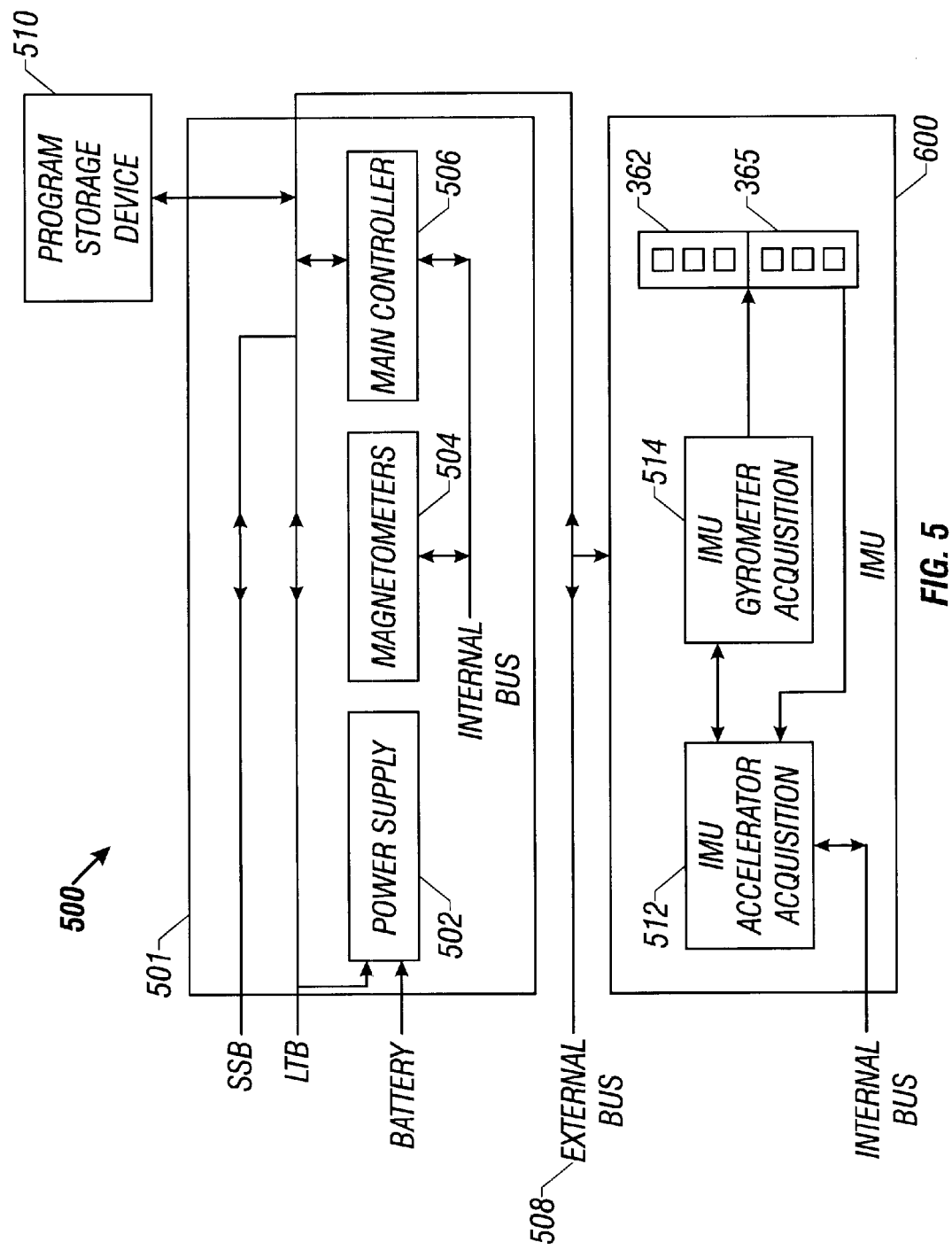
FIG. 5 is a block diagram of one particular apparatus constructed and operated in accordance with a second aspect of the invention.

An Exemplary INS Probe, Including an IMU in Accordance with the Present Invention FIG. 5 is a conceptualized block diagram of one particular embodiment 500 of the INS probe 325 in FIG. 3B and/or the INS probe 410 in FIG. 4B, constructed and operated in accordance with a second aspect of the invention. The INS probe 500 includes an electronics subassembly 501 comprising a power supply 502, several magnetometers 504, and a main controller 506. The INS probe 500 also includes an IMU 600, discussed further below, that communicates with the electronics subassembly 501 over the external bus 508. The IMU 600, as will be discussed more fully below, includes a set 362 of three vibrating mass, Coriolis effect gyroscopes and a set 365 of three accelerometers.

FIG. 5 also depicts a program storage device 510. In the particular embodiment illustrated, the signals generated by the set 365 of accelerometers and the set 362 of gyrometers are generally processed by software after their acquisition by the acquisition electronics 512, 514 in the IMU 600. More particularly, the program storage device 510 is encoded with instructions that, when executed, perform a method such as the method 100 in FIG. 1. The program storage device 510 may be located uphole, as in the embodiment in FIG. 5, or downhole. If located uphole, the data is transmitted uphole to equipment such as the processing equipment 345 in FIG. 3B. The data can then be analyzed by a processor such as the processor 350, also shown in FIG. 3B or the signal processor 424 in FIG. 4B. Alternative embodiments might choose to place the program storage device 510 downhole in the electronics subassembly 500. If located downhole, the instructions may be executed by a downhole processor, such as the controller 506.

The INS probe 500, in the illustrated embodiment, includes two MWD operating modes:
(i) a D&I mode tool gyrocompasses at each pipe connection, the measurement being triggered by the mud pumps cycling off; with the results stored uphole on mud telemetry.
(ii) a continuous tool mode, to which the INS probe 500 is for a continuous survey started at bottom before pulling out.

Figure 6:
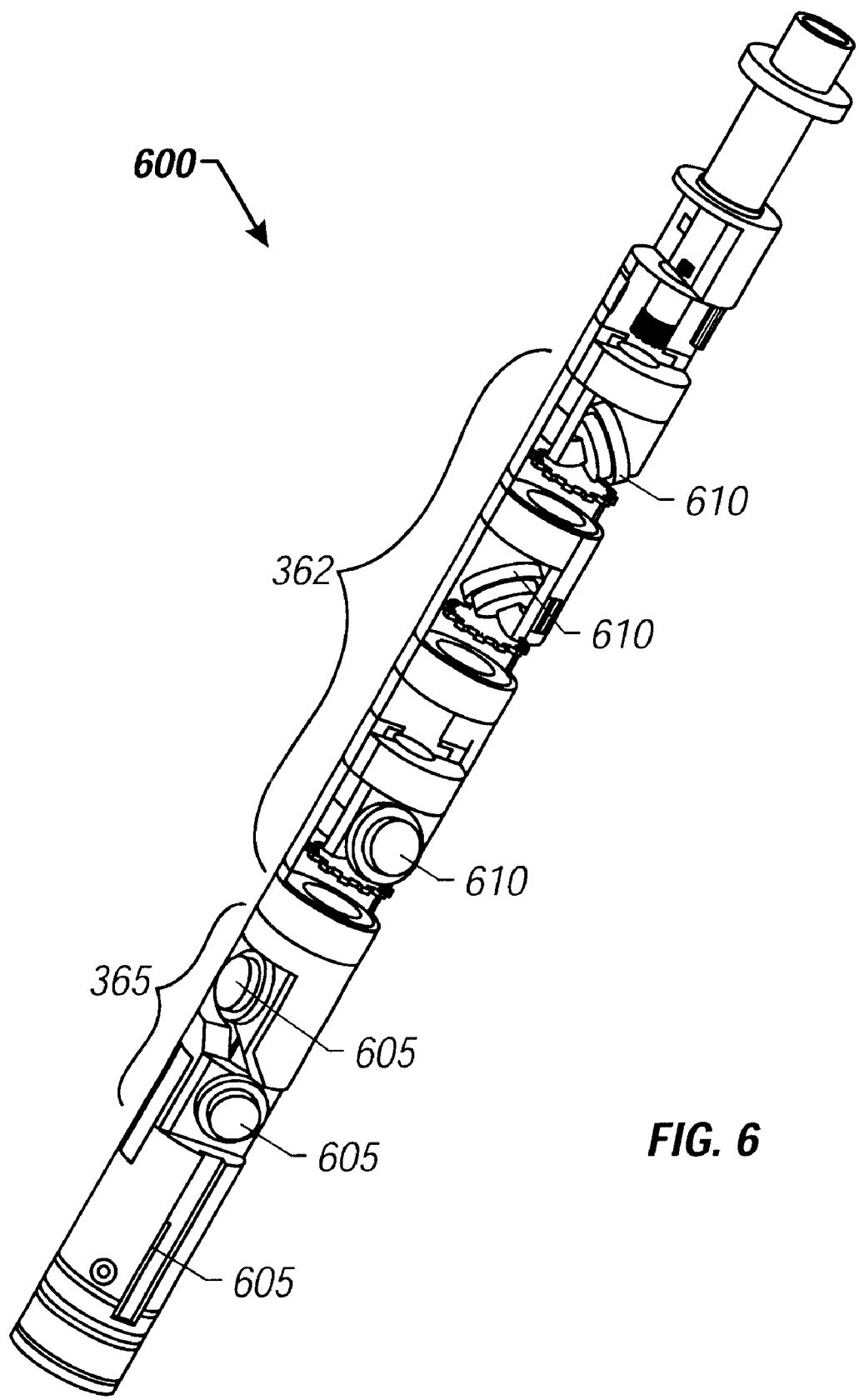
FIG. 6 is a perspective view of an Inertial Measurement Unit ("IMU") as may be used in one particular implementation of the apparatus in FIG. 5.

The INS probe 500 also includes two wireline-open hole/cased hole modes:
(i) a recorded modem, in which the INS probe 500 gyrocompasses at the surface and record surveys continuously into and out of the well. The results are stored in down hole memory and dumped to surface computer after the survey. The INS probe 500 is periodically stopped for zero velocity updates in this mode.
(ii) a surface readout mode, in which the INS probe 500 gyrocompasses at the surface to start a continuous survey from the surface to the True Depth ("TD") and back. This mode has the advantage of a measured cable velocity and closed loop Kalman filtering, which yields a more accurate survey The IMU FIG. 6 is a perspective view of an IMU 600 first discussed above and as may be used in one particular implementation of the apparatus in FIG. 5. The IMU 600 includes a set 365 of three orthogonally positioned accelerometers 605 and a set 362 of HRGs 610. The simplest embodiment of the IMU places three HRGs 610 orthogonally at 90° from each other. Another, alternative, embodiment skews the orthogonal arrangement of the three HRGs 610 to reduce the size of the package. In this embodiment, discussed further in connection with FIGS. 7A–7C, the gyroscope input axes are skewed 60° from each other on the longitudinal axis of the INS probe 500. This second embodiment is disclosed herein, but either embodiment may be used in various implementations of the invention.

Construction of the HRGs

Figure 7:
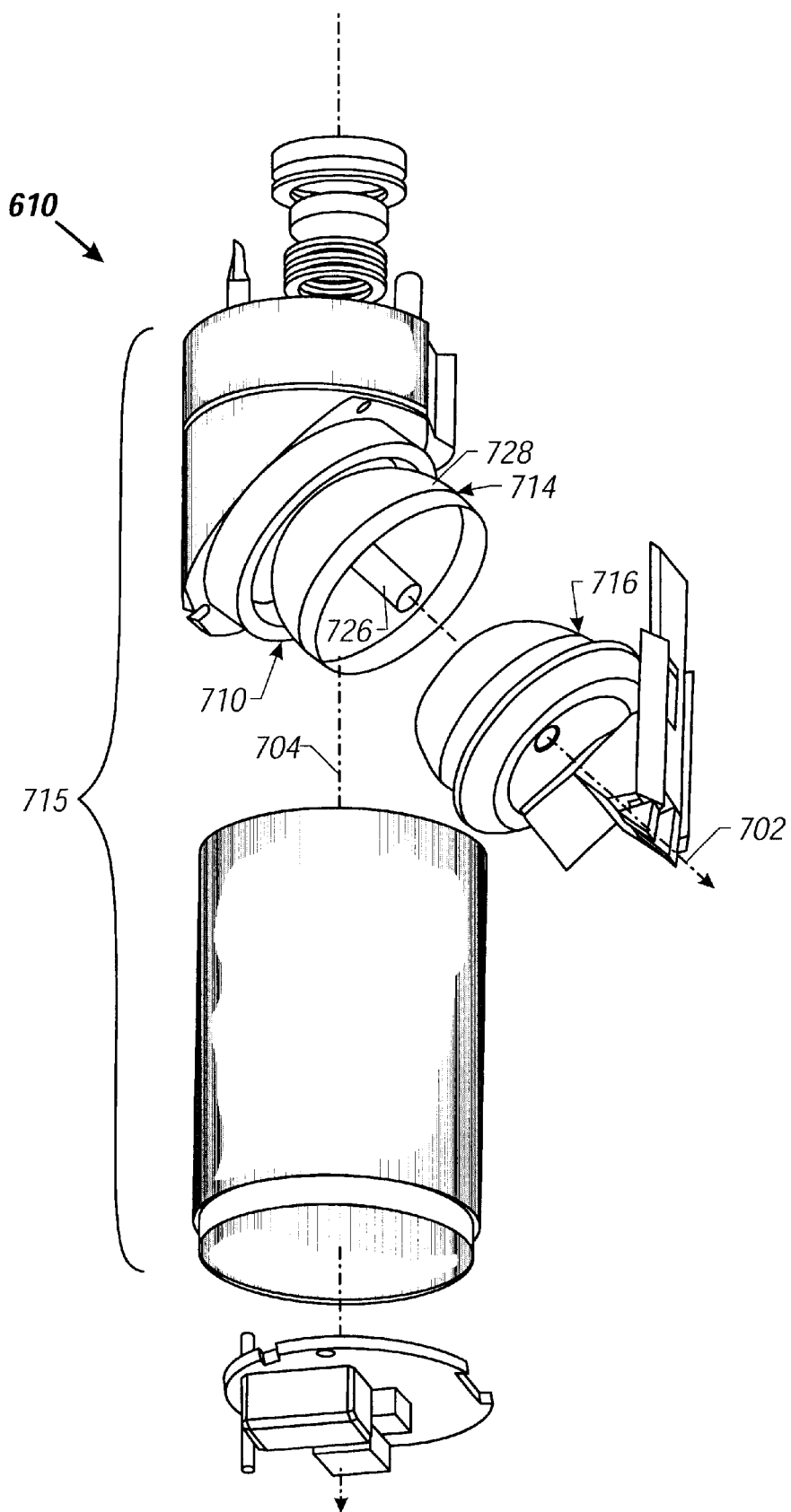
FIG. 7 illustrates one of the vibrating mass, Coriolis effect gyroscopes shown in FIG. 6(a) in partially exploded view.

FIG. 7 is a partially exploded view of one of the Hemispherical Resonator Gyroscopes ("HRGs") 610 shown in FIG. 6 The construction and operation of the particular HRG 610 shown in FIGS. 7A–7C is disclosed in greater detail in U.S. Pat. No. 5,712,427, entitled "Vibratory Rotation Sensor with Scanning-Tunneling-Transducer Readout," issued Jan. 27, 1998, to Litton Systems Inc. as the assignee of the inventor Anthony Matthews (the "'427 patent). Referring now to FIG. 7A, the particular embodiment of the HRG 610 illustrated is a solid state gyroscope whose inertially sensitive element is a fused silica (quartz) axisymmetric shell, or resonator, 714. The resonator 714 is rotated about its axis and the oscillating mass elements experience Coriolis forces that cause the standing wave to rotate or precess with respect to the shell. In addition to the resonator 714. itself, a forcer/pickoff 716 is made from fused quartz with metallized electrodes for capacitive forcing and readout.

The forcer/pickoff 716, in the embodiment illustrated, is a unitary, itegrated structure. However, in some embodiments, the forcer and pickoff functions may be separated into separate structures and bonded together with a glass frit bond. One such embodiment is shown in the '427 patent. The entire assembly of the resonator 714 forcer and pickoff 716, is then soldered, using a tin/silver/indium solder, into an Invar vaccum housing 715.

Note that the HRG 610 is mounted such that its longitudinal axis 702 is skewed relative to the longitudinal axis 704 of the IMU 600. However, the invention is not so limited and the HRG 610 may be mounted so that the longitudinal axes 702, 704 are aligned. The skewed embodiment illustrated is generally more compact than an aligned embodiment (not shown). Compactness is typically desirable in the design and operation of such instruments and so the skewed embodiment may be preferred over an aligned embodiment in many implementations. When rotary drilling starts, the HRGs 610 are used in their rate gyro mode, constantly monitoring the rotation around the longitudinal axis of the MWD. In the, skewed scenario, where the gyros are skewed at the same 60-degree angle on the MWD long axis, all gyros give the same reading. This allows scale factor matching and correction to be made.

The forcer/pickoff 716 contains a ring forcer electrode (not shown), used to sustain vibration of the resonator 714 at constant amplitude. discrete forcer electrodes (also not shown), used to suppress quadrature vibration of the resonator. The forcer/pickoff 716 contains eight non-capacitive pickoff electrodes, preferably tunneling transducers, (not shown) used to sense the azimuth orientation of the vibration pattern of the resonator 714.

A resonator stem 726 passes through the hemisphere 728 of the resonator 714. The resonator stem 726 supports the resonator 714 with minimal damping of its vibratory motion and provides separate electrical connections to the inner and outer hemispherical surfaces of the hemisphere 728. The length of the stem 726 is chosen so that the mounting surfaces are more than three stem, diameters removed from the transition area between the stem and the hemisphere.

The forcer electrodes not shown address the outer surface of the hemisphere 728 and are circular in shape. The pickoff transducers (also not shown) address the inner surface 730 of the resonator 714. The tunneling transducers 724 are fabricated on silicon substrates 725, and are attached to the pickoff housing 727 by countersinking the silicon substrates 725 into the housing 727 and attaching them with indium bonding techniques. The transducers 724 are positioned on the housing 727 so that the distances between their respective tunneling tips 729 and the inside surface 730 of the resonator are small enough to allow quantum-mechanical tunneling between the transducer tips 729 and the resonator surface 730, preferably in an amount no greater than approximately 13 microns. In operation, a tunneling current is established between the tunneling tip 729 and the resonator surface 730. The pickoff transducers electrically interact with the inner surface of the hemisphere 728 to produce a standing wave pattern in the resonator 714. The standing wave pattern in the resonator 714 causes it to flex, which changes the spacing between the pickoff transducers and the inner surface of the resonator 714. The change in the spacing causes a change in the measured voltage in the gyroscope electronics.

A gas getter not shown maintains a high vacuum inside the gyroscope housing 715 in order to reduce aerodynamic damping of the resonator 714 to an acceptable level. The getter maybe a commercially available device of sintered zirconium, and is preactivated and sealed inside a titanium capsule (also not shown). The capsule is designed so that it can be opened to the inside volume of the vacuum housing 715 after final sealing of the HRG 610. This feature provides the opportunity to observe the rate at which internal gas pressure builds up following sealing of the HRG 610 so that the quality of the hermetic seal can be determined.

The internal gas pressure can be estimated from a measurement of the damping time of the resonator 714, and the rate at which pressure builds up can then be used to predict the useful life of the HRG 610.

Operation of the HRGs

Figure 8B:
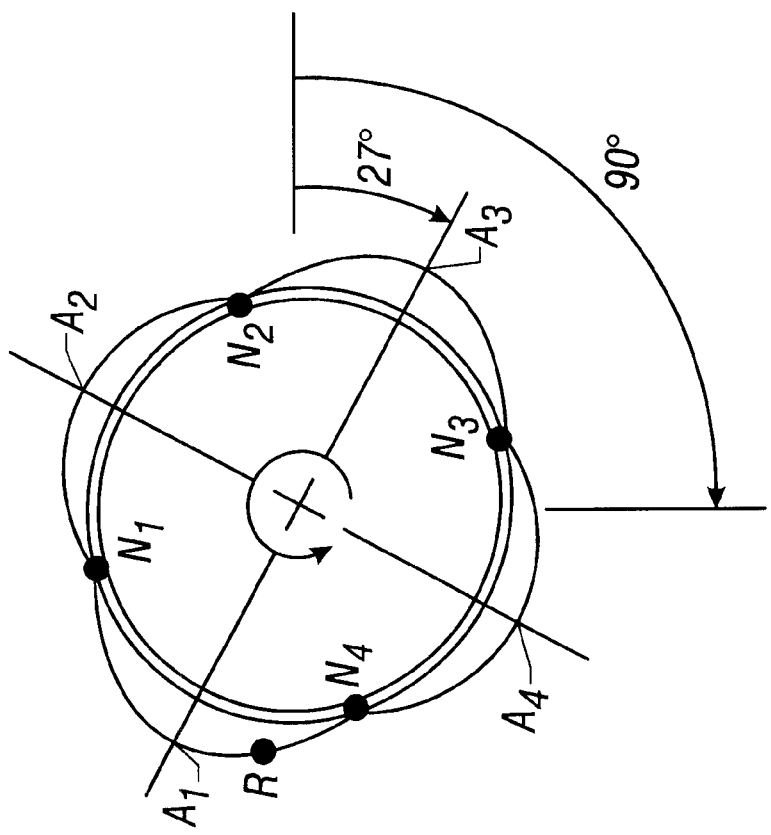
Figure 8A:
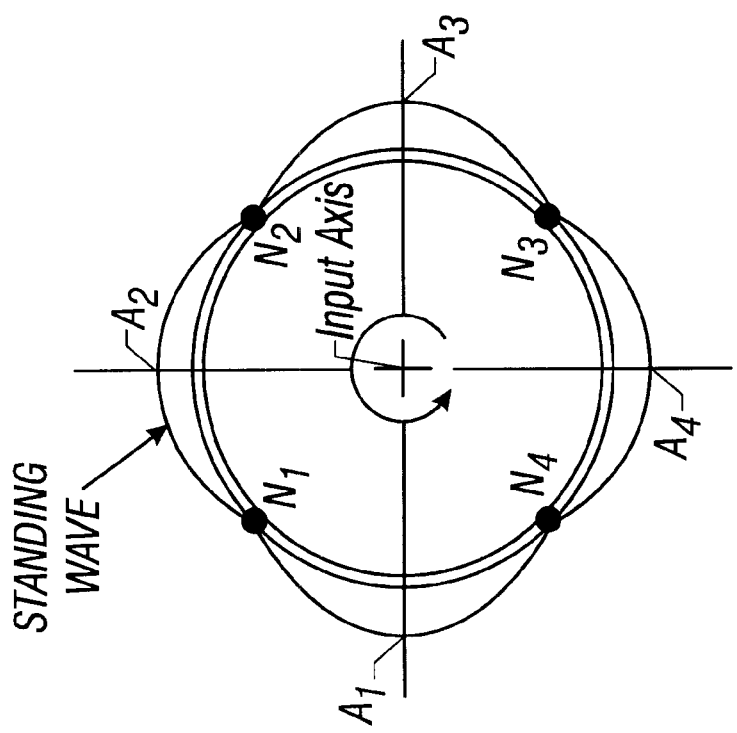

FIGS. 8A–8B illustrate some principles of operation for the HRG 610 of FIGS. 7A–7B. FIGS. 8A and 8B illustrate how the vibration or flexural standing wave pattern responds to inertial rotation of the resonator 714 (not shown) about its polar axis (as shown). Assume that the vibration pattern antinodes $A_1$–$A_4$ are initially aligned with the reference pointR and 45° offset from the rodes $N_1$–$N_4$, as shown in FIG. 8A. During a 90° counter-clockwise rotation of the resonator 714, the antinodes $A_1$–$A_4$ will precess relative to the reference R by approximately 27° in the clockwise direction. The relative precession rate, or angular gain, is very nearly 0.3, and is a geometric constant of the resonator 714. In other words, if a standing wave is established on the shell, e.g., the forcer/pickoff 716, and the shell is rotated about its axis, the oscillating mass elements, e.g., the resonator 714, experience Coriolis forces. The Coriolis forces cause the standing wave to rotate as process with respect to the shell.

The gyroscopes of the IMU 600 should be inertial grade gyroscopes. The accelerometers 605 may be any type of accelerometer known to the art to be suitable for the intended purpose. Two accelerometers known to be suitable are the MWD TA-150 and the ruggedized QA-2000-030. Both of these accelerometers are commercially available from Allied Signal Corporation. Other suitable accelerometers are known to the art and may also be employed in alternative embodiments.

Examples of how Construction of the IMU Discussed Above Affects the Analysis of Signals Generated Thereby The skewed orientation of the HRGs relative to the longitudinal axis of the IMU illustrated in FIG. 7A affects the manner in which the signals they produce are analyzed. To illustrate this affect, a coarse (analytic) alignment and continuously updated attitude algorithms for a skewed -gyroscope inertial measurement unit (IMU) are set forth below. The example below applies to both the embodiment of FIGS. 3A–3B and the embodiment of FIG. 4A, both of which employ the IMU of FIGS. 5–6 and the HRGs of FIGS. 7A–7C. For conventional IMU comprising orthogonally mounted gyroscopes, two axis gyroscope systems can be applied for alignments in vertical or horizontal wells. Or, at the cost of alignment accuracy, the strapdown two-gyroscope IMU may be applied for.deviated wells. Here, a strapdown IMU consisting of three skewed HRGs and three orthogonally mounted accelerometers is assumed.

Frame of Reference Transformations

Figure 9:
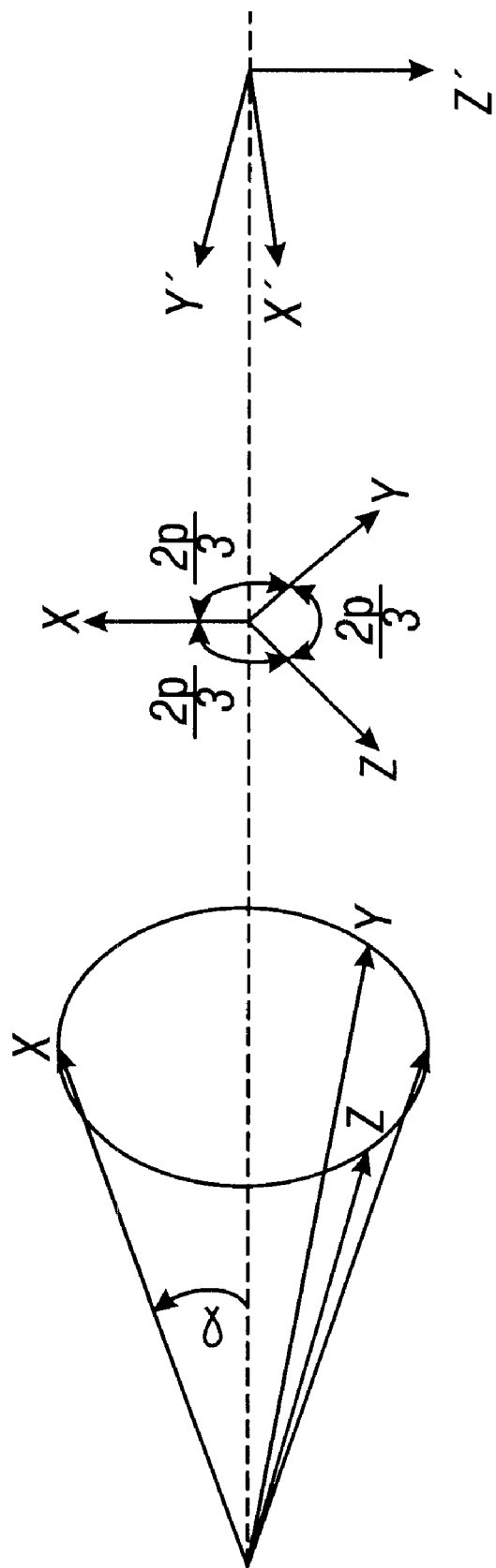
FIG. 9 shows an example of a skewed gyroscope frame reference and an orthogonal gyroscope frame of reference.

FIG. 9 shows the relationship between an example of skewed gyroscope frame and an orthogonal one. A coordinate transformation between two frames is then given by $$X' = -\cos\alpha(X + Y + Z)$$

$$Y' = -\frac{1}{2}\sin\alpha(Y - Z)$$

$$Z' = -\sin\alpha\left(X - \frac{\sqrt{3}}{2}Y - \frac{\sqrt{3}}{2}Z\right)$$

where skewed axes are X, Y, and Z, orthogonal axes are X', Y', and Z', and assuming $$\alpha = \frac{\pi}{4},$$

Furthermore, $$\text{Let } X \equiv \begin{pmatrix} X' \\ Y' \\ Z' \end{pmatrix}.$$

Then X is normalized by $$X_{NORM} = \frac{X}{\sqrt{X'^2 + Y'^2 + Z'^2}}$$

Once the mathematical form of the coordinate transformation between two frames is given as above, the orthogonal frame (XYZ) is hereafter used in this discussion. For simplicity, this discussion assumes that an accelerometer frame and an IMU body frame are identical with the gyroscope orthogonal frame. Consequently, mechanical misalignments about inertial sensors are not considered herein.

Analytic Alignment

Figure 10:
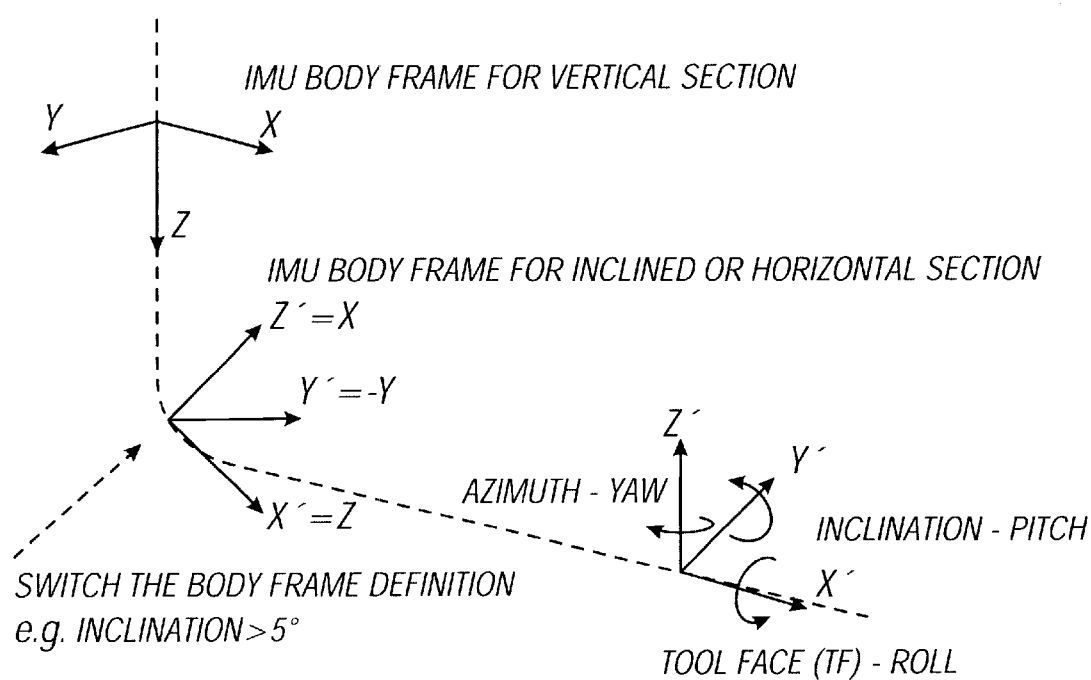
FIG. 10 shows the IMU body frame in FIG. 9 renamed in order to define all Euler angles without singularity.

The analytic alignment for the IMU determines a Direction Cosine Matrix ("DCM") that transforms the local-vertical navigation coordinate frame to the strapdown platform (body) frame. Then three Euler angles—gyroscope-tool-face (roll), inclination (pitch), and azimuth (yaw) are immediately derived from the DCM. For simplicity, the IMU shown in FIG. 9 is inclined. Then, the IMU body frame—X, Y, Z in FIG. 9-is renamed to X'=Z, Y'=−Y, Z'=X in order to define all Euler angles without singularity as shown in FIG. 10. In fact, definition of strapdown body frame is arbitrary, and it should be properly used and switched in IMU alignment between vertical and horizontal sections of well in order to. prevent singularities.

As shown below, the DCM transforms vectors in navigation frame to vectors in IMU-body frame where actual measurements of physical quantities are done:

$$f^b = C_n^b f^n$$
$$\underline{\omega}^b = C_n^b \underline{\omega}^n \qquad (1)$$
$$h^b = C_n^b (f^n \times \underline{\omega}^n)$$

where $f^b$ ($f^n$) ≡ the specific (i.e., gravity in stationary alignment) vector with respect to inertial space measured in body (navigation) frame, and $\underline{\omega}^b$($\underline{\omega}^n$) ≡ the angular rate (i.e., earth rate in stationary alignment) vector with respect to inertial space measured in body (navigation) frame.

Now Eqs. (1) can be expressed in single matrix equation as follows:

$$\begin{pmatrix} f_j^b \\ \omega_j^b \\ h_j^b \end{pmatrix} = \begin{pmatrix} f_1^n & f_2^n & f_3^n \\ \omega_1^n & \omega_2^n & \omega_3^n \\ (f^n \times \omega^n)_1 & (f^n \times \omega^n)_2 & (f^n \times \omega^n)_3 \end{pmatrix} \begin{pmatrix} c_{j1} \\ c_{j2} \\ c_{j3} \end{pmatrix} \qquad (2)$$

for j=1, 2, 3, and $c_{jk}$ is the jk-th element of the DCM $C_n^b = (c_{ji})$. The inverse of the 3×3 matrix on the right-hand side of (2) exists if $f^n \times \underline{\omega}^n \neq 0$, i.e if the gravity vector is not parallel to the earth rate vector. Consequently, Eq. (2) has no solution about $c_{jk}$ where those two vectors are parallel, namely at the north- and south-poles, and the alignment becomes meaningless.

When $f^n \times \underline{\omega}^n \neq 0$, Eq. (2) can be solved such as $$\begin{pmatrix} c_j^1 \\ c_j^2 \\ c_j^3 \end{pmatrix} = \begin{pmatrix} f_1^n & f_2^n & f_3^n \\ \omega_1^n & \omega_2^n & \omega_3^n \\ (f^n \times \omega^n)_1 & (f^n \times \omega^n)_2 & (f^n \times \omega^n)_3 \end{pmatrix}^{-1} \begin{pmatrix} f_{jb} \\ \omega_{jb} \\ h_{jb} \end{pmatrix} \qquad (3)$$

Defining the navigation frame as east-north-up frame and expressing the gravity and earth rate vectors in that frame:

$$f^n = [0\ 0\ g]^T;$$
$$\underline{\omega}^n [0 \Omega \cos L\ \Omega \sin L]^T;$$

where $\Omega$ = earth rotation rate; and L = geographic latitude at the alignment. Then the vector product is given by:

$$f^n \times \underline{\omega}^n = [-g\Omega\cos L\ 0\ 0]^T.$$

Putting (4), (5), and (6) into (3), yields $$\begin{pmatrix} c_{j1} \\ c_{j2} \\ c_{j3} \end{pmatrix} = \begin{pmatrix} 0 & 0 & g \\ 0 & \Omega\cos L & \Omega\sin L \\ -g\Omega\cos L & 0 & 0 \end{pmatrix}^{-1} \begin{pmatrix} f_j^b \\ \omega_j^b \\ h_j^b \end{pmatrix} \qquad (7)$$

Straightforward calculation for the inverse matrix in Eq. (7) gives $$\begin{pmatrix} c_{j1} \\ c_{j2} \\ c_{j3} \end{pmatrix} = \begin{pmatrix} 0 & 0 & \frac{-1}{g\Omega\cos L} \\ \frac{-\tan L}{g} & \frac{1}{g\Omega\cos L} & 0 \\ \frac{1}{g} & 0 & 0 \end{pmatrix}^{-1} \begin{pmatrix} f_j^b \\ \omega_j^b \\ h_j^b \end{pmatrix} \qquad (8)$$

Since $$\underline{h}^b = [f_2^b \omega_3^b - f_3^b \omega_2^b\ f_3^b \omega_1^b - f_1^b \omega_3^b\ f_1^b \omega_2^b - f_2^b \omega_1^b]^T, \qquad (9)$$

Putting (9) in (7), and having a set of solutions of Eq. (2) in terms of elements of DCM as follows:

$$c_{j1} = \frac{-h_j^b}{g\Omega\cos L} \qquad (10)$$

$$c_{j2} = \frac{\omega_j^b}{\Omega\cos L} - \frac{f_j^b}{g}\tan L$$

$$c_{j3} = \frac{f_j^b}{g}$$

where $h_j^b$ is calculated by gyroscope and accelerometer outputs as shown in (9):

$$h_1^b = f_2^b \omega_3^b - f_3^b \omega_2^b;$$
$$h_2^b = f_3^b \omega_1^b - f_1^b \omega_3^b;$$
$$h_3^b = f_1^b \omega_2^b - f_2^b \omega_1^b.$$

Or, normalizing vector components by $$F_j^b = \frac{f_j^b}{g} \qquad (11)$$

$$W_j^b = \frac{\omega_j^b}{\Omega}$$

$$H_j^b = \frac{h_j^b}{g\Omega}$$

writing (10) in simpler form:

$$c_{j1} = -H_j^b \sec L$$

$$c_{j2} = W_j^b \sec L - F_j^b \tan L \qquad (12)$$

$$c_{j3} = F_j^b$$

where $$H_1^b = F_2^b W_3^b - F_3^b W_2^b;$$
$$H_2^b = F_3^b W_1^b - F_1^b W_3^b;$$
$$H_3^b = F_1^b W_2^b - F_2^b W_1^b.$$

As explicit representation by its component, the DCM is now given by $$C_n^b = \begin{pmatrix} (F_3^b W_2^b - F_2^b W_3^b)\sec L & W_1^b \sec L - F_1^b \tan L & F_1^b \\ (F_1^b W_3^b - F_3^b W_1^b)\sec L & W_2^b \sec L - F_2^b \tan L & F_2^b \\ (F_2^b W_1^b - F_1^b W_2^b)\sec L & W_3^b \sec L - F_3^b \tan L & F_3^b \end{pmatrix} \qquad (13)$$

On the other hand, the body-to-navigation DCM $C_b^n = (C_n^b)^{-1}$ can be expressed by Euler parameters—tool-face (roll) φ, inclination (pitch) φ, and azimuth (yaw) Ψ as follows:

$$C_b^n = \begin{pmatrix} \sin\psi\cos\theta & -\cos\psi\cos\theta - \sin\psi\sin\theta & \cos\psi\sin\theta - \sin\psi\sin\theta\cos\phi \\ \cos\psi\cos\theta & \sin\psi\cos\phi - \cos\psi\sin\theta\sin\phi & -\sin\psi\sin\phi - \cos\psi\sin\theta\cos\phi \\ \sin\theta & \cos\theta\sin\phi & \cos\theta\cos\phi \end{pmatrix} \quad (14)$$

Since the DCM is an orthogonal matrix, i.e., $C_b^n = (C_n^b)^1$, comparing (13) and (14), $$C_b^n = \begin{pmatrix} \sin\psi\cos\theta & -\cos\psi\cos\theta - \sin\psi\sin\theta & \cos\psi\sin\theta - \sin\psi\sin\theta\cos\phi \\ \cos\psi\cos\theta & \sin\psi\cos\phi - \cos\psi\sin\theta\sin\phi & -\sin\psi\sin\phi - \cos\psi\sin\theta\cos\phi \\ \sin\theta & \cos\theta\sin\phi & \cos\theta\cos\phi \end{pmatrix}$$

$$= \begin{pmatrix} (F_3^b W_2^b - F_2^b W_3^b)\sec L & (F_1^b W_3^b - F_3^b W_1^b)\sec L & (F_2^b W_1^b - F_1^b W_2^b)\sec L \\ W_1^b \sec L - F_1^b \tan L & W_2^b \sec L - F_2^b \tan L & W_3^b \sec L - F_3^b \tan L \\ F_1^b & F_2^b & F_3^b \end{pmatrix} \quad (15)$$

then

Tool-Face: $\phi = a\tan\dfrac{F_2^b}{F_3^b}$ (16a)

Inclination: $\phi = a\tan\dfrac{F_1^b}{\sqrt{(F_2^b)^2 + (F_3^b)^2}}$ (16b)

Azimuth: $\psi = a\tan F_3^b W_2^b - \dfrac{F_2^b W_3^b}{W_1^b - F_1^b \sin L}$ (16c)

where X-, Y-, and Z-body axes are defined as forward, left, and up, respectively (cf FIG. 10).

Expressions (16a)–(16c) show that the derivation of Euler angles are directly based on measurements of acceleration and angular rate. If the measured signals via gyroscope or accelerometer contain significant random noises, the analytic alignment based on (16a)–(16c) is no longer practical. A method using alignment Kalman filter is usually taken in such a case for system redundancy.

Azimuth Error Analysis

In gimbaled systems, mechanical construction of the gimbal generally causes.a system limit to the maximum inclination, say, at 70° inclination in practice. In strapdown systems, however, such a limitation to the maximum inclination does not principally exist, especially upon switching the body frame definition as described previously.

In general, azimuth uncertainty $\delta\Psi$ when the strapdown IMU is truly aligned to north in east-north-up navigation frame is given by $$\delta\Psi = \dfrac{\sqrt{B_w^2 + N_w^2/T}}{\Omega \cos L} \quad (17)$$

where $B_w$ and $N_w$ are west- (y-) gyroscope bias and angular random walk, respectively, and where T is an alignment time. Eq. (17) is generally used to show alignment quality of the strapdown IMU system.

Tool Face Update

The Tool Face update is derived below at stationary position, which means assuming approximately no position displacement of the IMU during the rotation about the X body axis.

First, the body-to-inertial DCM at t=0 is given by $$C_b^i(0) = C_n^i(0) C_b^n(0) \quad (18)$$

where $$C_n^i(0) - C_n^e(0) = \begin{pmatrix} \cos\lambda & -\sin\lambda\sin L & \sin\lambda\cos L \\ 0 & \cos L & \sin L \\ -\sin\lambda & -\cos\lambda\sin L & \cos\lambda\cos L \end{pmatrix} \quad (19)$$

then $C_n^e(0)$ is the initial navigation-to-earth-fixed-frame DCM, and $\lambda$ is a geographic longitude. Furthermore, $C_b^n(0)$ is given by (14) via the analytic alignment.

Let $C_b^i(0) = [\alpha_{jk}]$, j,k=1,2,3 then initial quaternion from body to inertial frame is given by $$q_b^i(0) = q_0(0) + q_1(0)i + q_2(0)j + q_3(0)k \quad (20)$$

where $i^2 = j^2 = k^2 = -1$ and ij=-ji=k, jk=kj=i, ki=-ik=j, furthermore $$q_0(0) = \dfrac{\sqrt{1 + \alpha_{11} + \alpha_{22} + \alpha_{33}}}{2}$$

$$q_1(0) = \dfrac{\alpha_{32} - \alpha_{23}}{4 q_0(0)}$$

$$q_2(0) = \dfrac{\alpha_{13} - \alpha_{31}}{4 q_0(0)}$$

$$q_3(0) = \dfrac{\alpha_{21} - \alpha_{12}}{4 q_0(0)}$$

Now, the second-order quaternion update is pursued. Let $\Delta\underline{\theta}_{ib}^b = [\Delta\theta_1 \ \Delta\theta_2 \ \Delta\theta_2]^T$ be a gyroscope readout (angular increment) at $t+\Delta t$ at the body (XYZ) frame with respect to inertial space. Then second-order-updated quaternion is given by $$q_b^i(t + \Delta t) = q_b^i(t)\left[1 + \dfrac{1}{2}\Delta\underline{\theta}_{ib}^b - \dfrac{1}{2}\left(\dfrac{\Delta\theta_{ib}^b}{2} \dfrac{\Delta\theta_{ib}^b}{2}\right)\right] \quad (21)$$

$$= q_b^i(t)\left[1 + \dfrac{1}{2}\Delta\underline{\theta}_{ib}^b - \dfrac{1}{2} \cdot \dfrac{\Delta\theta_{ib}^b}{2}\right]$$

In terms of elements of the quaternion:

$$q_0(t + \Delta t) = q_0(t)\left(1 - \frac{\Delta\theta_1^2 + \Delta\theta_2^2 + \Delta\theta_3^2}{8}\right)$$

$$q_0(t + \Delta t) = q_i(t) \cdot \frac{\Delta\theta_i}{2} \quad i = 1, 2, 3.$$

After the quaternion update (21), $q^i_b$ is periodically (e.g., every 4 [sec]) normalized via $$q^i_{bNORM} = q_0 + q_1 i + q_2 j + q_3 k = q^i_b / |q^i_b| \tag{22}$$

where $|q^i_b| \equiv \sqrt{q^{1\,2}_0 + q^{1\,2}_1 + q^{1\,2}_2 + q^{1\,2}_3}$, and $q^i_b \equiv q^1_0 + q^1_0 + q^1_1 i + q^1_2 j + q^1_3 k$.

Now, the updated (and normalized) body-to-inertial DCM is expressed by the updated and normalized quaternion (22), such that $$C^i_b(t + \Delta t) = \begin{pmatrix} 1 - 2(q_2^2 + q_3^2) & 2(q_1 q_2 - q_3 q_0) & 2(q_3 q_1 + q_2 q_0) \\ 2(q_3 q_0 + q_1 q_2) & 1 - 2(q_3^2 + q_1^2) & 2(q_2 q_3 - q_0 q_1) \\ 2(q_3 q_1 + q_2 q_0) & 2(q_2 q_3 + q_0 q_1) & 1 - 2(q_1^2 + q_2^2) \end{pmatrix} \tag{23}$$

On the other hand, update of the inertial-to-navigation DCM $C^n_i = C^n_e C^e_i$ is given by $$C^n_i(t+\Delta t) = C^n_e(t+\Delta t) C^e_i(t+\Delta t). \tag{24}$$

Then, because of the previous assumption, i.e., no positional displacement of the IMU during the Tool Face rotation, $$C^n_e(t + \Delta t) = \tag{25}$$

$$C^n_e(t) = C^n_e(0) = C^e_n(0)^t = \begin{pmatrix} \cos\lambda & 0 & -\sin\lambda \\ -\sin\lambda\sin L & \cos L & -\cos\lambda\sin L \\ \sin\lambda\cos L & \sin L & \cos\lambda\cos L \end{pmatrix}$$

and, because of the earth rotation with respect to inertial space during the IMU Tool Face rotation:

$$C^e_i(t + \Delta t) = \begin{pmatrix} \sin(\Omega(t + \Delta t)) & 0 & \cos(\Omega(t + \Delta t)) \\ \cos(\Omega(t + \Delta t)) & 0 & -\sin(\Omega(t + \Delta t)) \\ 0 & 1 & 0 \end{pmatrix} \tag{26}$$

Putting (25) and (26) into (24), and using (23), yields $$C^n_b(t+\Delta t) = C^n_e(t+\Delta t) C^e_i(t+\Delta t) C^i_b(t+\Delta t) \equiv [c_{jk}], j=1,2,3. \tag{27}$$

Now, via (27) and (14) the updated Tool Face angle is given by $$\phi = a\tan\frac{c_{32}}{c_{33}} \tag{28}$$

Furthermore, from (27) and (14), the updated inclination and azimuth angles are also available, and given by Inclination update: $\phi = a\tan\frac{c_{32}}{c_{33}}$ \hfill (29)

Azimuth update: $\psi = a\tan\frac{c_{11}}{c_{21}}$ \hfill (30)

The above derivation of updated tool face, inclination, and azimuth considers the earth rotation compensation via (26).

Operation of the Exemplary Probe in Accordance with the Present Invention

Orientation

The HRGs 610 measure the projection of the horizontal component of the Earth's rotation rate, and the on-board MWD accelerometers giving the position of the gyroscopes relative to vertical. A classical North seeking determination is then done, providing the orientation of the device relative to the geographic North, as demonstrated by the equations set forth above. The sensed rotation speed is integrated versus time to provide the angular variation since the initial orientation providing the steering capability using the gyroscope tool face, as described in equation (16a) above.

Steering

The IMU 600 will ordinarily be operated with the magnetometers 504, gyroscopes 362, and accelerometers 365 all running and generating data when appropriate for the particular operation. However, the invention is not so limited. For instance, if power consumption is an issue, the HRGs 610 may be switched off to save electrical power as soon as the magnetic field is within acceptable criteria. When the HRGs 605 are switched off, the operation and gravity tool face, using the six standard MWD sensors, i.e., the three magnetometers and the three accelerometers 605.

Surveying

The azimuth of the well may be determined in any circumstances, inside of a casing or outside. Inside of the casing, the HRGs 610 are used to perform a North Seeking operation as described in the "Orientation" section above, and if the well is not vertical, the azimuth of the well is determined using Equation 16c. Outside of the casing, the proposed system will be able to either continue using the gyroscope or use the magnetometers. In some circumstances, switching off the gyroscopes will be useful to save battery power and allow longer drilling sequences without trips for better replacement. In some other circumstances, if the drilling runs are short or if the MWD equipment is turbine powered, it will be possible to make all surveys with the gyroscopes. The on-board redundancy will also allow the selection one or the other mode of operation in case of a failure of a sensor.

Uses and Advantages of the Present Invention in its Various Aspects

Using the present invention with the strapdown inertial navigation and Kalman filtering techniques, a surveying system can be provided wherein the (inertial sensor) instrumentation package-to-borehole misalignment is minimized as an error source in the surveying. The path of the probe through the borehole in continuous surveying is determined independently of the attitude of the probe relative to the borehole. The strapdown computations are aided by a Kalman filter which uses zero-velocity information or which uses continuous velocity or path length information due to cable-length (speed) measurement.

The INS can be used in any of the following five survey operations:
(i) multishot gyrocompassing along the borehole in MWD;
(ii) multishot gyrocompassing along the borehole in WL logging;
(iii) ZUPT correction to inertial navigation in MWD;
(iv) ZUPT correction to inertial navigation in WL logging; and
(v) a continuous cable-aided inertial navigation in WL logging.

In cases of the ZUPT operations (iii) and (iv), the path of the probe through the borehole in the continuous surveying is not subject to errors due to cable length measurements and errors due to misalignment of the probe within the borehole. Low noise and excellent scale factor characteristics of the HRG can make a high precision gyrocompassing in relatively short period (~1 minute) for both MWD and WL surveys. A high precision inertial navigation for MWD and WL applications can also be performed.

The strapdown IMU comprises three vibrating mass, Coriolis effect gyroscopes rigidly mounted on a probe housing along with three accelerometers.

The IMU provides three rate-integrated signals from the three HRGs and three incremental velocity signals from the three accelerometers. All of the six inertial signals are sent to the following four computation algorithms implemented on the downhole probe or uphole computer: (i) gyrocompassing computations by means of analytic (coarse) alignment computation and fine alignment computation possibly employing a Kalman filter; (ii) velocity-attitude computations; and (iii) positional computations. (computing latitude and longitude). The computations of (ii) and (iii) and of true vertical depth (TVD) are aided by a linear or nonlinear estimator to compensate for system errors in combination with zero-velocity or cable-speed/ length signals. The linear and nonlinear estimators may include linear and extended Kalman filters (KFs), backward Kalman smoothers, and Minimum Model Error (MME) estimators.

The construction of the exemplary IMU discussed above brings the gyroscope functions on board the MWD tool and allows performance of orientation and steering operations without any extra equipment or wireline. The present invention, in its various aspects and embodiments, provides other innumerable advantages and benefits over those techniques in the known art. Among these advantages are:

rig time savings—elimination of wireline runs, redundant set of sensors for directional control minimize lost time for sensor failures and provides intrinsic quality control features.

surveying crew reduction—elimination of gyroscope personnel, as the proposed equipment is run by the; MWD crew.

equipment cost reduction—a number of functionalities are duplicated between a wireline gyroscope and a standard MWD.

The present invention also eliminates the duplication of pressure housings, power supply electronics, data acquisition electronics, data processing electronics, and depth measurement. A number of functionalities strictly related to the wireline operation are also eliminated, including wireline and winches, a wireline adapter head, and a Universal Bottom Hole Orientation sub ("UBHO").

However, the particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A strapdown inertial navigation method comprising:
maneuvering a probe including at least three vibrating mass, Coriolis effect gyroscopes in a borehole;
initializing the probe's attitude in the borehole within the probe's frame of reference;
determining, from the gyroscopes, three orthogonal, incremental rotation angles for the probe within the probe's frame of reference;
determining three orthogonal, incremental velocities for the probe within the probe's frame of reference;
translating the three incremental velocities from the probe's frame of reference into the inertial frame of reference using the three incremental rotation angles;
determining from the translated incremental velocities a velocity vector in a local-vertical, wander-azimuth frame of reference;
obtaining a velocity error observation;
estimating a system error from the velocity vector and a velocity error observation; and
feeding the system error back into the inertial navigation method.

2. The method of claim 1, wherein maneuvering the probe within the borehole includes maneuvering the probe within the borehole during measurement-while-drilling operations.

3. The method of claim 2, wherein the measurement-while-drilling operations include one of multi-shot gyrocompassing, measurement-while-drilling operations and zero-velocity update inertial navigation in measurement-while-drilling operations.

4. The method of claim 1, wherein maneuvering the probe within the borehole includes maneuvering the probe within the borehole during wireline logging operations.

5. The method of claim 4, wherein the wireline logging operations include one of multi-shot, gyrocompassing wireline operations; continuous, cable-aided inertial navigation in wireline logging operations; and zero-velocity update inertial navigation in wireline operations.

6. The method of claim 1, wherein initializing the probe's attitude within the probe's frame of reference includes at least one of a coarse alignment and a fine alignment.

7. The method of claim 6, wherein at least one of the coarse alignment and the fine alignment includes filtering.

8. The method of claim 1, wherein initializing the probe's attitude within the probe's frame of reference includes at least one of accelerometer error compensation and gyroscopic error compensation.

9. The method of claim 8, wherein at least one of the accelerometer error compensation and gyroscopic error compensation includes compensating for major deterministic errors.

10. The method of claim 9, wherein the major deterministic errors include a major deterministic error selected from the group comprising bias, scale factor error, and misalignment.

11. The method of claim 10, wherein translating the three incremental velocities from the probe's frame of reference into the inertial frame of reference includes determining the probe's velocity-attitude.

12. The method of claim 10, wherein determining the probe's velocity attitude includes updating a body-to-inertial direction cosine matrix and updating a body-to-inertial quaternion.

13. The method of claim 1, wherein at least one of translating the three incremental velocity signals into the inertial frame of reference and determining the position of the probe is aided by a linear estimator.

14. The method of claim 13, wherein the linear estimator includes one of a linear Kalman filter, an extended Kalman filter, a backward Kalman smoother, and a minimum model error estimator.

15. The method of claim 1, wherein at least one of translating the three incremental velocity signals into the inertial frame of reference and determining the position of the probe is aided by a non-linear estimator.

16. The method of claim 15, wherein the non-linear estimator includes one of a linear Kalman filter, an extended Kalman filter, a backward Kalman smoother, and a minimum model error estimator.

17. The method of claim 1, further comprising determining the position of the probe from the translated incremental velocities.

18. The method of claim 17, wherein determining the position of the probe from the translated incremental velocities includes determining the true vertical depth.

19. The method of claim 1, wherein determining from the translated incremental velocities a velocity vector in a local-vertical, wander-azimuth frame of reference includes applying an earth gravity model.

20. The method of claim 19, wherein feeding the system error back into the inertial navigation method includes feeding the system error into the earth gravity model.

21. The method of claim 1, wherein obtaining the velocity error observation includes obtaining a zero-velocity update.

22. The method of claim 1, wherein obtaining the velocity error observation includes:
   obtaining a cable velocity; and
   translating the cable velocity into the local-vertical frame of reference.

23. The method of claim 1, wherein estimating a system error from the velocity vector and the velocity error observation includes
   summing the velocity vector and the velocity error observation; and
   filtering the sum.

24. The method of claim 23, wherein filtering the sum comprises filtering the sum through a Kalman filter.

25. The method of claim 1, further comprising buffering the incremental rotation angles and the incremental velocities before translating the three incremental velocities from the probe's frame of reference into the inertial frame of reference.

26. The method of claim 1, wherein feeding the system error back into the inertial navigation method includes feeding the system error back into at least one of the initialization of the probe's attitude, the translation of the three incremental velocities from the probe's frame of reference into the inertial frame of reference, and the determination of the updated velocity vector.

27. The method of claim 1, wherein at least one of determining the rotation angles and determining the velocities includes at least one of accelerometer error compensation and gyroscopic error compensation.

28. The method of claim 27, wherein at least one of accelerometer error compensation and gyroscopic error compensation includes compensating for major deterministic errors.

29. The method of claim 28, wherein the major deterministic errors include a major deterministic error selected from the group comprising bias, scale factor error, and misalignment.

30. A strapdown, inertial measurement unit, comprising:
   a housing;
   three accelerometers mounted within the housing; and
   three vibrating mass, Coriolis effect gyroscopes rigidly mounted within the housing.

31. The strapdown inertial measurement unit of claim 30, wherein the three accelerometers are oriented orthogonally respective to each other.

32. The strapdown inertial measurement unit of claim 30, wherein the three gyroscopes are oriented orthogonally respective to each other.

33. The strapdown inertial measurement unit of claim 30, wherein at least one of the three gyroscopes includes a hemispherical resonator gyroscope.

34. The strapdown inertial measurement unit of claim 30, wherein the longitudinal axis of the gyroscopes is skewed relative to the longitudinal axis of the inertial measurement unit.

35. The strapdown inertial measurement unit of claim 33, wherein the longitudinal axis of the gyroscopes is skewed relative to the longitudinal axis of the inertial measurement unit at an angle of 60°.

36. The strapdown inertial measurement unit of claim 30, wherein at least one of the gyroscopes comprises:
   an axisymmetric resonator;
   a forcer joined to the resonator;
   a pickoff bonded to the forcer
   a vacuum housing into which the resonator, forcer, and pickoff are placed.

37. The strapdown inertial measurement unit of claim 34, wherein the longitudinal axis of the gyroscopes is skewed relative to the longitudinal axis of the inertial measurement unit.

38. The strapdown inertial measurement unit of claim 30, further comprising three magnetometers mounted within the housing.

39. An inertial navigation probe, comprising:
   a strapdown inertial measurement unit, including:
      three accelerometers oriented orthogonally respective to each other and mounted within the housing; and
      three vibrating mass, Coriolis effect gyroscopes oriented orthogonally respective to each other and rigidly mounted within the housing; and
      acquisition electronics for the accelerometers and the gyroscopes; and
   an external bus;
   an electronics subassembly capable of communicating with the inertial measurement unit over the external bus, the electronics subassembly including:
      a plurality of magnetometers;
      a controller; and
      an internal bus over which the magnetometers and the controller communicate;
      a power supply for powering at least one of the accelerometers, gyroscopes, magnetometers, acquisition electronics, controllers.

40. The inertial navigation probe of claim 39, wherein the longitudinal axis of the gyroscopes is skewed relative to the longitudinal axis of the inertial measurement unit.

41. The inertial navigation probe of claim 40, wherein the longitudinal axis of the gyroscopes is skewed relative to the longitudinal axis of the inertial measurement unit at an angle 60°.

42. The inertial navigation probe of claim 39, wherein at least one of the gyroscopes comprises:
 an axisymmetric resonator;
 a forcer joined to the resonator;
 a pickoff bonded to the forcer
 a vacuum housing into which the resonator, forcer, and pickoff are placed.

43. The inertial navigation probe of claim 41, wherein the longitudinal axis of the gyroscopes is skewed relative to the longitudinal axis of the inertial measurement unit.

44. The inertial navigation probe of claim 39, wherein the strapdown inertial measurement unit further includes three magnetometers.

45. The inertial navigation probe of claim 39, further comprising a program storage device encoded with instructions that, when executed by the controller, perform a method comprising:
 initializing the probe's attitude in the borehole within the probe's frame of reference;
 determining three orthogonal, incremental rotation angles for the probe within the probe's frame of reference;
 determining three orthogonal, incremental velocities for the probe within the probe's frame of reference;
 translating the three incremental velocities from the probe's frame of reference into the inertial frame of reference using the three incremental rotation angles;
 determining from the translated incremental velocities a velocity vector in a local-vertical, wander-azimuth frame of reference;
 obtaining a velocity error observation;
 estimating a system error from the velocity vector and a velocity error observation; and
 feeding the system error back into the inertial navigation method.

46. A strapdown inertial navigation method for use in measurement-while-drilling operations, the method comprising:
 maneuvering a probe in a borehole during drilling operations;
 initializing the probe's attitude in the borehole within the probe's frame of reference;
 determining three orthogonal, incremental rotation angles for the probe within the probe's frame of reference;
 determining three orthogonal, incremental velocities for the probe within the probe's frame of reference;
 translating the three incremental velocities from the probe's frame of reference into the inertial frame of reference using the three incremental rotation angles;
 determining from the translated incremental velocities a velocity vector in a local-vertical, wander-azimuth frame of reference;
 obtaining a velocity error observation;
 estimating a system error from the velocity vector and a velocity error observation; and
 feeding the system error back into at least one of initializing the probe's attitude, translating the three incremental velocities, and determining the velocity vector.

47. The method of claim 46, wherein the measurement-while-drilling operations include one of multi-shot gyrocompassing, measurement-while-drilling operations and zero-velocity update inertial navigation in measurement-while-drilling operations.

48. The method of claim 46, wherein initializing the probe's attitude within the probe's frame of reference includes at least one of a coarse alignment and a fine alignment.

49. The method of claim 48, wherein at least one of the coarse alignment and the fine alignment includes filtering.

50. The method of claim 46, wherein initializing the probe's attitude within the probe's frame of reference includes at least one of accelerometer error compensation and gyroscopic error compensation.

51. The method of claim 50, wherein at least one of the accelerometer error compensation and gyroscopic error compensation includes compensating for major deterministic errors.

52. The method of claim 51, wherein the major deterministic errors include a major deterministic error selected from the group comprising bias, scale factor error, and misalignment.

53. The method of claim 52, wherein translating the three incremental velocities from the probe's frame of reference into the inertial frame of reference includes determining the probe's velocity-attitude.

54. The method of claim 52, wherein determining the probe's velocity attitude includes updating a body-to-inertial direction cosine matrix and updating a body-to-inertial quaternion.

55. The method of claim 46, wherein at least one of translating the three incremental velocity signals into the inertial frame of reference and determining the position of the probe is aided by a linear estimator.

56. The method of claim 55, wherein the linear estimator includes one of a linear Kalman filter, an extended Kalman filter, a backward Kalman smoother, and a minimum model error estimator.

57. The method of claim 46, wherein at least one of translating the three incremental velocity signals into the inertial frame of reference and determining the position of the probe is aided by a non-linear estimator.

58. The method of claim 57, wherein the non-linear estimator includes one of a linear Kalman filter, an extended Kalman filter, a backward Kalman smoother, and a minimum model error estimator.

59. The method of claim 46, further comprising determining the position of the probe from the translated incremental velocities.

60. The method of claim 59, wherein determining the position of the probe from the translated incremental velocities includes determining the true vertical depth.

61. The method of claim 46, wherein determining from the translated incremental velocities a velocity vector in a local-vertical, wander-azimuth frame of reference includes applying an earth gravity model.

62. The method of claim 61, wherein feeding the system error back into the inertial navigation method includes feeding the system error into the earth gravity model.

63. The method of claim 46, wherein obtaining the velocity error observation includes obtaining a zero-velocity update.

64. The method of claim 46, wherein obtaining the velocity error observation includes:
 obtaining a cable velocity; and
 translating the cable velocity into the local-vertical frame of reference.

65. The method of claim 46, wherein estimating a system error from the velocity vector and the velocity error observation includes summing the velocity vector and the velocity error observation; and filtering the sum.

66. The method of claim 65, wherein filtering the sum comprises filtering the sum through a Kalman filter.

67. The method of claim 46, further comprising buffering the incremental rotation angles and the incremental velocities before translating the three incremental velocities from the probe's frame of reference into the inertial frame of reference.

68. The method of claim 46, wherein feeding the system error back into the inertial navigation method includes feeding the system error back into at least one of the initialization of the probe's attitude, the translation of the three incremental velocities from the probe's frame of reference into the inertial frame of reference, and the determination of the updated velocity vector.

69. The method of claim 46, wherein at least one of determining the rotation angles and determining the velocities includes at least one of accelerometer error compensation and gyroscopic error compensation.

70. The method of claim 69, wherein at least one of accelerometer error compensation and gyroscopic error compensation includes compensating for major deterministic errors.

71. The method of claim 70, wherein the major deterministic errors include a major deterministic error selected from the group comprising bias, scale factor error, and misalignment.

* * * * *

UNITED STATES PATENT AND TRADEMARK OFFICE
Certificate

Patent No. 6,453,239 B1                                                Patented: September 17, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Ichiro Shirasaka, Sugar Land, TX (US); Kirby G. Schrader, Houston, TX (US); Jean-Michel Hache, Houston, TX (US); Anthony Matthews, Santa Barbara, CA (US); and Guy T. Varty, Woodland Hills, CA (US).

Signed and Sealed this Thirty first day of March 2009

THOMAS G. BLACK
*Supervisory Patent Examiner*
Art Unit 3661